United States Patent
Andersen et al.

(10) Patent No.: US 12,510,165 B2
(45) Date of Patent: Dec. 30, 2025

(54) ACTUATOR ARRANGEMENT AND A METHOD FOR MOVING A VALVE MEMBER INTO A CLEANING POSITION

(71) Applicant: ALFA LAVAL CORPORATE AB, Lund (SE)

(72) Inventors: Jens Folkmar Andersen, Fredericia (DK); Johnny Ebsen, Kolding (DK)

(73) Assignee: ALFA LAVAL CORPORATE AB, Lund (SE)

( * ) Notice: Subject to any disclaimer, the term of this patent is extended or adjusted under 35 U.S.C. 154(b) by 14 days.

(21) Appl. No.: 18/722,225

(22) PCT Filed: Dec. 20, 2022

(86) PCT No.: PCT/EP2022/086993
§ 371 (c)(1),
(2) Date: Jun. 20, 2024

(87) PCT Pub. No.: WO2023/118143
PCT Pub. Date: Jun. 29, 2023

(65) Prior Publication Data
US 2025/0060040 A1   Feb. 20, 2025

(30) Foreign Application Priority Data
Dec. 21, 2021   (EP) .................................. 21216427

(51) Int. Cl.
*F16K 1/44*   (2006.01)
*F16K 31/04*   (2006.01)
*F16K 31/50*   (2006.01)

(52) U.S. Cl.
CPC .............. *F16K 1/446* (2013.01); *F16K 1/443* (2013.01); *F16K 31/046* (2013.01);
(Continued)

(58) Field of Classification Search
USPC .............. 137/614.18, 630.16, 630.18, 637.4; 251/129.11
See application file for complete search history.

(56) References Cited

U.S. PATENT DOCUMENTS 778,664 A  *  12/1904  Kilburn .................. F16K 1/443
                                                       137/630.18
959,618 A       5/1910   Schmidt
(Continued)

FOREIGN PATENT DOCUMENTS

CH         231313 A     3/1944
CN       111810655 A   10/2020
(Continued)

OTHER PUBLICATIONS

International Search Report (PCT/ISA/210) and Written Opinion (PCT/ISA/237) mailed Apr. 3, 2023, by the European Patent Office as the International Searching Authority for International Application No. PCT/EP2022/086993. (13 pages).

*Primary Examiner* — Matthew W Jellett
(74) *Attorney, Agent, or Firm* — BUCHANAN INGERSOLL & ROONEY PC

(57) ABSTRACT

An actuator arrangement configured to be controlled by a control unit and to control a flow control arrangement includes a housing, a first valve stem configured to be connected to and control movement of a first valve member of the flow control arrangement, a second valve stem configured to be connected to and control movement of a second valve member of the flow control arrangement, a first electrical motor comprising a first rotor and a first stator, the first rotor being rotatable about the longitudinal axis, a second electrical motor comprising a second rotor and a second stator, the second rotor being rotatable about the longitudinal axis, wherein the first rotor is configured to provide a first movement of the first valve stem and the (Continued)

second rotor is configured to provide a first movement of the second valve stem. A method for moving the first valve stem is also disclosed.

17 Claims, 12 Drawing Sheets

(52) U.S. Cl.
CPC .......... *F16K 31/047* (2013.01); *F16K 31/508* (2013.01); *Y10T 137/87105* (2015.04); *Y10T 137/87121* (2015.04); *Y10T 137/87917* (2015.04); *Y10T 137/88038* (2015.04)

(56) References Cited

U.S. PATENT DOCUMENTS

| | | | | |
|---|---|---|---|---|
| 1,047,774 | A * | 12/1912 | Schmid | F16K 1/446 137/614.18 |
| 1,613,183 | A * | 1/1927 | Maxwell | F16K 41/14 137/630.18 |
| 2,860,266 | A * | 11/1958 | Schrader | F16K 31/046 310/83 |
| 4,687,015 | A * | 8/1987 | Mieth | F16K 1/446 137/240 |
| 6,014,983 | A * | 1/2000 | Sondergaard | F16K 1/446 137/240 |
| 6,089,255 | A * | 7/2000 | Bonnefous | F16K 1/446 251/63.5 |
| 7,111,642 | B2 * | 9/2006 | Takeda | F23N 1/005 137/614.19 |
| 8,100,381 | B2 * | 1/2012 | Roschke | F16K 31/0658 251/129.1 |
| 9,927,043 | B2 * | 3/2018 | Sakaguchi | F02M 23/006 |
| 10,221,996 | B2 | 3/2019 | Sauer | |
| 10,900,583 | B2 * | 1/2021 | Gagliano | F16K 37/005 |
| 10,995,862 | B2 | 5/2021 | Lang et al. | |
| 2009/0127485 | A1 | 5/2009 | Wessel et al. | |
| 2016/0298773 | A1 | 10/2016 | Beck et al. | |
| 2019/0250645 | A1 * | 8/2019 | Kanamori | G05D 7/0647 |

FOREIGN PATENT DOCUMENTS

| | | |
|---|---|---|
| EP | 0074088 B1 | 5/1986 |
| EP | 2239174 B1 | 1/2013 |
| WO | 2017042361 A1 | 3/2017 |

* cited by examiner

ACTUATOR ARRANGEMENT AND A METHOD FOR MOVING A VALVE MEMBER INTO A CLEANING POSITION

FIELD OF INVENTION

The disclosure relates to an actuator arrangement. The disclosure also relates to a method for moving a first valve stem of an actuator arrangement in order to move a first valve member into a first cleaning position.

TECHNICAL BACKGROUND

There are many different types of valve arrangements that are deployed in various industrial applications. The valve arrangements may comprise a control unit, an actuator arrangement, and a flow control arrangement, wherein the actuator arrangement may be controlled by the control unit and may be configured to control the flow control arrangement. One such kind of valve arrangement includes a double valve member interacting with a double seat. Such a valve may e.g., be used as a mix proof valve. Such valve arrangements may be controlled such that the different valve members may be moved separately from each other in order to facilitate cleaning.

Document WO 2017/042361 discloses a valve arrangement including a double valve member, e.g., a mix proof valve, controlled by an actuator which is operated by pressurized air and springs. The actuator is mechanically coupled to an upper valve member cooperating with a upper valve seat and to a lower valve member cooperating with a lower valve seat. The valve members are movable partly independently relative each other and also together. In a closed position of the valve members, each valve member seals against the associated seats. In an open position, both valve members are moved upwardly into the upper conduit section to open the connection between the two conduit sections. The actuator arrangement is also configured to set the valve members in a first cleaning position where the lower valve member is pushed slightly downwardly such that it no longer seals against the lower seat and thereby exposes the lower valve seat while the upper valve member still is sealingly engaging the upper seat. The actuator arrangement is also configured to set the valve members in a second cleaning position where the upper valve member is lifted slightly upwardly such that it no longer seals against the upper seat and thereby exposes the upper valve seat while the lower valve member still is sealingly engaging the lower seat.

However, a drawback with this solution is that when a valve member is to return to its normal position by spring force, the volume of compressed air has to be bled almost completely form the actuator before the valve member is returned to its normal position. Therefore, as the compressed air has to be bled almost completely from the actuator, the valve member moves relatively slowly when returning to normal position.

Thus, as will be explained below, there is room for improvements when it comes to adequately addresses the set of design criteria of enabling a flexible and efficient actuator arrangement which is also cost-efficient but still provides the basic function of providing a flow control arrangement with a double valve and double seat and which is capable of being cleaned in an efficient manner. A further design criterion which should be met is to provide for a more environmentally friendly arrangement.

SUMMARY OF INVENTION

It is an object of the invention to provide a solution which adequately addresses the set of criteria of enabling a flexible and efficient actuator arrangement which is also cost-efficient but still provides the basic function of providing a flow control arrangement with a double valve and double seat and which is capable of being cleaned in an efficient manner. A further design criterion which should be met is to provide for a more environmentally friendly arrangement.

This object has been achieved by an actuator arrangement being configured to be controlled by a control unit and being configured to control a flow control arrangement, the actuator arrangement comprising:

a housing, a first valve stem extending along a longitudinal direction and being configured to be connected to and control movement of a first valve member of the flow control arrangement, a second valve stem extending along the longitudinal direction and being configured to be connected to and control movement of a second valve member of the flow control arrangement, wherein the flow control arrangement comprises a first and a second conduit section, each being configured to allow a respective flow of a respective fluid, wherein the first and second conduit sections are arranged beside each other as seen along the longitudinal direction and wherein the first and second conduit sections are fluidly interconnected by a connecting opening being selectively closable and openable by a double valve formed by the first and second valve members, wherein, in a closed position of the double valve, the first and second valve members are sealingly engaging a first and a second valve seat, respectively, each valve seat extending around the connecting opening, wherein the first and second valve members are movable relative to each other to allow selective cleaning of the first conduit section, the first valve member, and the first valve seat, respectively the second conduit section, the second valve member, and the second valve seat, wherein in a first cleaning position, in which the first conduit section, the first valve member and first valve seat are to be cleaned, the first valve stem is configured to provide a movement of the first valve member towards the first conduit section thereby exposing the first valve seat, wherein in a second cleaning position, in which the second conduit section, the second valve member and second valve seat are to be cleaned, the second valve stem is configured to provide a movement of the second valve member along a longitudinal axis thereby exposing the second valve seat, wherein the actuator arrangement further comprises a first electrical motor comprising a first rotor and a first stator, the first rotor being rotatable about the longitudinal axis, wherein the first valve stem comprises a threaded portion and the first rotor is configured to grip around the threaded portion of the first valve stem such that a first rotational movement of the first rotor provides a first movement of the first valve stem in a direction opposite the longitudinal direction into the first cleaning position, wherein the actuator arrangement further comprises a second electrical motor comprising a second rotor and a second stator, the second rotor being rotatable about the longitudinal axis, wherein the second valve stem comprises a threaded portion and the second rotor is configured to grip around the threaded portion of the second valve stem such that a first rotational movement of the second rotor provides a first movement of the second valve stem along the longitudinal axis into the second cleaning position.

In this context, the longitudinal direction is defined as a first direction along the longitudinal axis and the direction opposite the longitudinal direction is hence defined as second direction, opposite the first direction, along the longitudinal axis. The actuator is typically arranged above the conduit sections and thereby the longitudinal direction, the first direction, will in practice typically be a downward direction and hence the direction opposite the longitudinal direction, the second direction, will typically be an upward direction. The longitudinal direction, the direction opposite the longitudinal direction and the longitudinal axis are parallel to each other.

The threaded portion may be an integral part of the valve stem part connected to the valve member. The threaded portion may be a separately manufactured part being connected to other parts together forming the valve stem. In this context, the term "grip around" should be interpreted as the respective rotor is in contact with and extends around the respective valve stem such that the rotational motion of the rotor may be transferred into a linear motion to the respective valve stem and thereby move the respective valve stem along the longitudinal axis. The threaded portion may refer to a helical extended shaft having a pitch.

In this context, in the second cleaning position, the second valve stem is configured to provide a movement of the second valve member thereby exposing the second valve seat by providing for the second valve member to be moved either towards the first conduit section or towards the second conduit section. The second valve member may be moved in a first direction along the longitudinal axis in order to be moved towards the first conduit section and thereby expose the second valve seat. The second valve member may alternatively be moved in a second direction, being opposite the first direction, along the main axis in order to be moved towards the second conduit section and thereby expose the second valve seat. The second rotor may be configured to provide the first movement of the second valve stem in the direction opposite the longitudinal direction into the second cleaning position. The second rotor may be configured to provide the first movement of the second valve stem in the longitudinal direction into the second cleaning position. When the second valve member is moved towards the first conduit section, this is also referred to as providing a seat lift of the second valve member. When the second valve member is moved towards the second conduit section, this is also referred to as providing a seat push of the second valve member. Thus, the second valve member is configured to be moved towards either the first conduit section or the second conduit section to reach the second cleaning position. It may be noted that a specific flow control arrangement is typically designed such that only one of these options is used.

In the first cleaning position, when the first valve member is moved towards the first conduit section, this movement is also referred to as providing a seat lift of the first valve member.

In this context, the first movement of the first valve stem and the first movement of the second valve stem may be movements in the same direction, being the direction opposite the longitudinal direction. The first movement of the first valve stem and the first movement of the second valve stem may be movements in the different directions, wherein the first movement of the first valve stem is in the direction opposite the longitudinal direction and the first movement of the second valve stem is in the longitudinal direction. It should be noted that either the first valve stem or the second valve stem may be moved such that either the first cleaning mode or the second cleaning mode is reached. If both the first and second valve stems are moved, the double valve may be moved in an open position instead.

The second valve member may have a circumferentially extending gasket. The circumferentially extending gasket of the second valve member may be positioned in a sealing surface of the second valve member. If the first movement of the second valve stem, i.e., the movement providing the actuator arrangement to be set in the second cleaning position, is in the longitudinal direction, the sealing surface may be an axially extending surface and thereby form part of a so-called radial sealing between the second valve member and the second valve seat. Typically, the second valve stem may in such a case be moved in the direction opposite the longitudinal direction when the double valve is to be set in an open position and the second valve stem may be moved in the longitudinal direction when the second valve member is to set in the second cleaning position. However, it may be noted that it is possible to provide a second cleaning position between the closed position of the second valve member and the closed position of the first valve member by providing a radially widened section between on one side the axially extending surface forming the second valve seat and on the other side the first valve seat.

If the first movement of the second valve stem is in the direction opposite the longitudinal direction, the sealing between the second valve member and the second valve seat may be a so-called axial seal, sometimes referred to as a face seal. In such a case, the second cleaning position of the second valve member is located between the closed position of the second valve member and the closed position of the first valve member and this is accomplished by providing a radially widened section between the second valve seat and the first valve seat.

The valve members may be movable partly independently relative each other and also together. Thus, the movement of the valve members may be activated independently or together.

The first valve member may be set in the first cleaning position in which the first valve member has been lifted a short distance into, or at least towards, the first conduit section thereby exposing the first valve seat associated with the first valve member. The second valve member may remain in contact with the second valve seat and the connecting opening may thereby still remain closed.

The second valve member may be set in the second cleaning position in which the second valve member has been pushed a short distance into the second conduit section thereby exposing the second valve seat associated with the second valve member. The first valve member may remain in contact with the first valve seat and the connecting opening may thereby still remain closed.

The valve members may be set in the respective cleaning position at the same time in which the valve members are positioned at a distance from each other. In this way, a cleaning liquid used in the respective cleaning position is able to be discharged via a drain being located in a midsection of the second valve member. By the drain, the cleaning liquid is discharged from the actuator arrangement.

By the first electrical motor being configured to provide a movement of the first valve stem and the second electrical motor being configured to provide a movement of the second valve stem, it is possible to control the movement of the respective valve stem independently from each other and in an efficient way. By eliminating the pressurized air, which is used in conventional actuator arrangements, and instead introduce an electrically controlled actuator it is made possible to move the valve stems more rapidly and thereby providing a quicker movement of the valve members into the respective cleaning position. Moreover, this also provides for that the speed, time, extent and frequency of the movement of the valve members into the respective cleaning position may be controlled in an improved way. Thus, depending on the application and the need for cleaning, the speed, time, extent, and frequency of the movement may be varied in order to provide as efficient cleaning as possible in a given application. Using the electrically operated actuator arrangement with individually driven valve stems, the respective cleaning position may be designed to fit the application. The speed, the opening height and the time in cleaning position may be set individually for each application. Moreover, an adjustable pause between openings of the respective cleaning mode may be added. In this context, opening of the respective cleaning mode is when the first valve member or second valve member has been moved from its valve seat such that the cleaning may be provided. Thus, the cleaning procedure may be individually designed for a specific application.

An advantage with being able to move the valve stems more rapidly, is that it is possible to save water which is used during the cleaning of the first and second conduit sections. This is possible because the cleaning process may be designed for the specific design. In addition, by increasing the speed of the seat lift or seat push, the time for providing the seat lift or seat push is decreased which in itself will reduce the water usage. By being able to save water, both a cost reduction and a positive environmental effect will be achieved.

A further advantage is that the actuator arrangement is configured to operate, in addition to the open position and the closed position, also in intermediate positions, e.g., positions being between the open position and the closed position. This is possible due to that the actuator arrangement is operated by the electrical motors which facilitate the provision of being able to control the movements of the valve stems in an efficient and controllable way.

Thus, with the disclosed the design, it is possible to improve the cleaning effect adjusted to application and product and to reduce water usage. Thereby, there is achieved an actuator arrangement which allows for a cost-efficient an environmentally friendly use scenario.

The first valve member may be denoted first valve disc. The second valve member may be denoted second valve disc.

The first and the second conduit section may each extend in a transverse direction. The first and the second conduit section may each be configured to allow a respective flow of a respective fluid in a transverse direction. Thus, the first and the second conduit section may each extend in and be configured to allow a respective flow of a respective fluid in a transverse direction.

The first rotor may further be configured to grip around the threaded portion of the first valve stem such that a second rotational movement, being opposite the first rotational movement, of the first rotor provides a second movement of the first valve stem in the longitudinal direction into the closed position.

This is advantageous in that it is possible to provide a complete cleaning cycle for the first conduit section, the first valve member and first valve seat. The first valve stem is controlled by the actuator arrangement operated by the first electrical motor in both moving the first valve member into the first cleaning position and returning the first valve member to the closed position. Thus, it is possible to improve the control of movement of the first valve member in both the direction opposite the longitudinal direction and in the longitudinal direction. The closed position is also referred as the normal position throughout the application. It may be noted that during a cleaning cycle, the valve stem may be moved back and forth fully or partly along the first movement, and fully or partly along the second movement several times. Thus, the valve member may reach the closed position several times during one cleaning cycle. The valve member may also or alternatively be moved towards the closed position, but not reach the closed position, several times during one cleaning cycles.

The second rotor may further be configured to grip around the threaded portion of the second valve stem such that a second rotational movement, being opposite the first rotational movement, of the second rotor provides a second movement of the second valve stem along the longitudinal axis in a direction being opposite the direction of the first movement of the second valve stem into the closed position.

This is advantageous in that it is possible to provide a complete cleaning cycle for the second conduit section, the second valve member and second valve seat. The second valve stem is controlled by the actuator arrangement operated by the second electrical motor in both moving the second valve member into the second cleaning position and returning the second valve member to the normal, closed, position. Thus, it is possible to improve the control of movement of the second valve member in both the direction opposite the longitudinal direction and in the longitudinal direction. It may be noted that during a cleaning cycle, the valve stem may be moved back and forth fully or partly along the first movement, and fully or partly along the second movement several times. Thus, the valve member may reach the closed position several times during one cleaning cycle. The valve member may also or alternatively be moved towards the closed position, but not reach the closed position, several times during one cleaning cycles.

In order to set the double valve in an open position in which the first valve member and the second valve member may move towards the first conduit section to thereby open the connecting opening and allowing fluid to flow between the first and second conduit sections, the second rotor may be configured to grip around the threaded portion of the second valve stem such that a third rotational movement of the second rotor provides a third movement of the second valve stem in the direction opposite the longitudinal direction, the second valve stem may be moved along, or more precisely in, the direction opposite the longitudinal direction until the second valve member reaches the first valve member such that the first and second valve members are sealingly engaging each other, and when the first and second valve members may be sealingly engaging each other, the first rotor may be configured to grip around the threaded portion of the first valve stem such that a third rotational movement of the first rotor may provide a third movement of the first valve stem in the direction opposite the longitudinal direction, wherein, when the first and second valve members may be sealingly engaging each other, the first and second valve stems may be moved in a synchronous motion into the open position while maintaining a sealing engagement between the first and second valve members.

In this context, the term "moved towards" should be interpreted as the first and second valve members are moved into, or at least towards, the first conduit section to thereby open the connecting opening and allowing fluid to flow between the first and second conduit sections.

With such design, it is possible to operate the valve stems in combination when synchronously moving the valve members towards the open position. By being able to operate the valve stems in combination, it is possible to keep the valve members sealingly engaging each other when moving towards and being in the open position. By keeping the valve members sealingly engaged to each other, it prevents fluid from flowing between the valve members. Fluid flowing between the valve members will typically be directed to a drain.

In order to move the double valve from the open position to a closed position in which the first valve member and the second valve member engages with respective valve seat, the first rotor may be configured to grip around the threaded portion of the first valve stem such that a fourth rotational movement of the first rotor in a direction opposite the third rotational movement of the first rotor may provide a fourth movement of the first valve stem along, or more precisely in, the longitudinal direction into the closed position, and the second rotor may be configured to grip around the threaded portion of the second valve stem such that a fourth rotational movement of the second rotor in a direction opposite the third rotational movement of the second rotor may provide a fourth movement of the second valve stem in the longitudinal direction into the closed position, wherein the first and second valve members may be sealingly engaging each other during the movement in the longitudinal direction, wherein the first and second valve stems may be moved in the synchronous motion, until the first valve member engages with the first valve seat and whereafter the second valve stem may continue to move until the second valve member engages with the second valve seat. More precisely, the first and second valve members may be sealingly engaging each other during the movement in the longitudinal direction and the first and second valve stems may be moved in the synchronous motion until the first valve member engages with the first valve seat and whereafter the second valve stem may continue to move until the second valve member engages with the second valve seat. Even more precisely, the first and second valve members may be sealingly engaging each other during the movement in the longitudinal direction until the first valve member engages with the first valve seat and the first and second valve stems may be moved in the synchronous motion until the first valve member engages with the first valve seat and whereafter the second valve stem may continue to move until the second valve member engages with the second valve seat.

In this context, the first and second valve members are sealingly engaging each other during movement from the open position towards the closed position, wherein towards should be interpreted as until the first valve member has reached the first valve seat. Thereafter, the second valve member keeps moving until it has reached the second valve seat. As said above, it is important that the valve members are sealingly engaging each other during movement between the open position and the closed position, or more precisely during movement from the open position until the first valve member has reached the first valve seat, in order to prevent fluid from flowing between the valve members and into undesired locations within the flow control arrangement. Fluid flowing between the valve members will typically be directed to a drain.

The first rotor may form part of a nut of a ball screw-and-nut assembly and the threaded portion of the first valve stem may form ball tracks that guides balls of the ball screw-and-nut assembly.

This is advantageous in that it allows the first rotor to rotate about the longitudinal axis, wherein rotational motion of the first rotor is transferred to the first valve stem such that the first valve stem is moved axially along the longitudinal axis. A further advantage with this design is that the transfer of the rotational motion to linear motion may be able to apply or withstand high thrust loads and may also do so with low internal friction.

The first rotor may form part of other assemblies in which the first rotor is arranged as a linear actuator configured to translate rotational motion to linear motion, preferably with low internal friction.

The second rotor may form part of a nut of a ball screw-and-nut assembly and the threaded portion of the second valve stem may form ball tracks that guides balls of the ball screw-and-nut assembly.

This is advantageous in that it allows the second rotor to rotate about the longitudinal axis, wherein the rotational motion of the second rotor is transferred to the second valve stem such that the second valve stem is moved axially along the longitudinal axis. A further advantage with this design is that the transfer of the rotational motion to linear motion may be able to apply or withstand high thrust loads and may also do so with low internal friction.

The second rotor may form part of other assemblies in which the second rotor is arranged as a linear actuator configured to translate rotational motion to linear motion, preferably with low internal friction.

The actuator arrangement may further comprise a (first) rotation prevention mechanism which may be arranged between the first valve stem and an inner support structure forming part of or being connected to the housing of the actuator arrangement and may be configured to prevent the first valve stem from rotating in relation to the housing. By preventing the valve stem from rotating in relation to the housing it is secured that the valve stem does not begin to rotate with the rotation of the rotor and thereby the rotation of the rotor will in relation to the non-rotating valve stem be transferred to the intended axial movement of the valve stem.

The actuator arrangement may further comprise a (second) rotation prevention mechanism which may be arranged between the second valve stem and an inner support structure forming part of and being connected to the housing of the actuator arrangement and may be configured to prevent the second valve stem from rotating in relation to the housing. By preventing the valve stem from rotating in relation to the housing it is secured that the valve stem does not begin to rotate with the rotation of the rotor and thereby the rotation of the rotor will in relation to the non-rotating valve stem be transferred to the intended axial movement of the valve stem.

The respective (first and second) rotation prevention mechanism may be provided in the form of a (respective first and second) rotation prevention member extending from the valve stem outwardly into contact with the housing. Alternatively, it may be provided in the form of a longitudinally extending slot or protrusion extending along the valve stem and interacting with a longitudinally extending protrusion or slot being fixed relative to the housing.

The rotation prevention mechanism is configured to prevent rotation at least for the above referred rotational movements of the first rotor imparted to provide the above referred movements of the first valve stem along the longitudinal axis.

The (first) rotation prevention mechanism which may be arranged between the first valve stem and the housing may comprise a (first) rotation prevention member which may be fixed relative to the first valve stem and which may be connected to the housing such that the (first) rotation prevention member may be rotationally fixed but movable along the longitudinal axis relative to the housing and such that the (first) rotation prevention member may be movable together with the first valve stem along the longitudinal axis while preventing the first valve stem from rotating relative to the housing.

The (second) rotation prevention mechanism which may be arranged between the second valve stem and the housing may comprise a (second) rotation prevention member which may be fixed relative to the second valve stem and which may be connected to the housing such that the (second) rotation prevention member may be rotationally fixed but movable along the longitudinal axis relative to the housing and such that the (second) rotation prevention member may be movable together with the second valve stem along the longitudinal axis while preventing the second valve stem from rotating relative to the housing.

It may be noted that the connection point between the (respective first and second) rotation prevention member and the housing does not need to be a rotationally fixed connection. A member being rotationally fixed to the valve stem and extending outwardly along, or more precisely in, a direction having at least a component along, or more precisely in, a radial direction relative the longitudinal axis to a radially and circumferentially fixed connection point to the housing will due to the geometric constraints retain its orientation and will thereby become rotationally fixed. In order to further improve this effect, the rotational prevention member may be connected to the housing at a plurality of circumferentially distributed connection points. This latter may be in the form of a single member having several connection points or by a plurality of separate members each being fixed to the valve stem and being connected to the housing at different connection points being circumferentially distributed around the longitudinal axis.

The actuator arrangement may further comprise a first electrically operated brake which may comprise a first rotor part connected to the first valve stem or to the first rotor of the first electrical motor, a first stator part connected to the housing, and an electromagnetically operated first interconnection member which may be movable between an engaged position and an open position, wherein when the first interconnection member is in the open position the first rotor part may be rotatable relative to the first stator part and when the first interconnection member is in the engaged position the first interconnection member brakes or prevents rotational movement of the first rotor part relative to the first stator part and thereby prevents movement of the first valve stem, wherein, when the first electrical motor may be running, the first interconnection member may be set in the open position, and wherein, preferably, when the first electrical motor may be stopped, the first interconnection member may be set in the engaged position and may thereby be configured to keep the first valve stem from moving and thereby keeping the first valve stem and first valve member in position, wherein the first interconnection member of the first electrically operated brake may preferably be mechanically biased into the engaged position.

The actuator arrangement may further comprise a second electrically operated brake which may comprise a second rotor part connected to the second valve stem or to the second rotor of the second electrical motor, a second stator part connected to the housing, and an electromagnetically operated second interconnection member which may be movable between an engaged position and an open position, wherein when the second interconnection member is in the open position the second rotor part may be rotatable relative to the second stator part and when the second interconnection member is in the engaged position the second interconnection member brakes or prevents rotational movement of the second rotor part relative to the second stator part and thereby prevents movement of the second valve stem, wherein, when the second electrical motor may be running, the second interconnection member may be set in the open position, and wherein, preferably, when the second electrical motor may be stopped, the second interconnection member may be set in the engaged position and may thereby be configured to keep the second valve stem from moving and thereby keeping the second valve stem and second valve member in position, wherein the second interconnection member of the second electrically operated brake may preferably be mechanically biased into the engaged position.

It may be noted that it is preferred, but not necessary, to set the respective interconnecting member in the engaged position when the respective motor is not activated to move the associated valve stem, because the respective motor may be controlled to keep the intended position. However, by setting the respective interconnecting member in the engaged position as soon as there is no intention to move the respective valve stem, there is no need to have electrical power constantly supplied to the motor. In this context, the position in the term "keeping the first valve stem and first valve member in position" is the position in which the first valve member was in when the first electrical motor is stopped. In this context, the position in the term "keeping the second valve stem and second valve member in position" is the position in which the second valve member was in when the second electrical motor is stopped.

The first interconnection member of the first electrically operated brake may be mechanically biased into the engaged position by a spring or the like such that it is set into the engaged position when there is no electrical power. The second interconnection member of the second electrically operated brake may be mechanically biased into the engaged position by a spring or the like such that it is set into the engaged position when there is no electrical power. Such mechanical bias makes it possible to secure that the valves remain in the intended positions also when there is a power failure.

The actuator arrangement may further comprise a backup battery configured to, if the first valve stem and/or the second valve stem may be in a position different from a normal position, and in case of loss of external electrical power, provide electricity to the first electrical motor and/or the second electrical motor and set the respective electrically operated brake in the open position and thereby provide a movement of the first valve stem and/or the second valve stem along the longitudinal axis into the normal position, and, when the first valve stem and/or second valve stem may have reached the normal position, operate the respective electrically operated brake to the engaged position and thereby keep the first valve stem and/or second valve stem in position.

In this context, the term normal position should be interpreted as being either the closed position or the open position as discussed above. The actuator arrangement may be a normally closed actuator arrangement or a normally open actuator arrangement. For the normally open actuator arrangement, the open position is the normal position. For the normally closed actuator arrangement, the closed position is the normal position. It is preferred, but not necessary, that the disclosed actuator arrangement is a normally closed actuator arrangement thereby the normal position is the closed position.

This is advantageous in that it allows the first valve stem and/or second valve stem to return to the normal position although e.g., a power failure, or any other loss of external electrical power, has occurred. This design may be interpreted as a safety mechanism which will start when the loss of external electrical power has occurred and thereby provide for that the first and/or second valve stems are able to return to their normal positions such that no fluid may be introduced in an unwanted conduit section.

The above object has also been achieved by a valve arrangement comprising a flow control arrangement and an actuator arrangement as described above.

Thereby, the above object has been achieved by a valve arrangement comprising a flow control arrangement and an actuator arrangement, wherein the actuator arrangement is configured to be controlled by a control unit and is configured to control the flow control arrangement, the actuator arrangement comprising:
  a housing,
  a first valve stem extending along a longitudinal direction and being configured to be connected to and control movement of a first valve member of the flow control arrangement,
  a second valve stem extending along the longitudinal direction and being configured to be connected to and control movement of a second valve member of the flow control arrangement,
  wherein the flow control arrangement comprises a first and a second conduit section, each being configured to allow a respective flow of a respective fluid, wherein the first and second conduit sections are arranged beside each other as seen along the longitudinal direction and wherein the first and second conduit sections are fluidly interconnected by a connecting opening being selectively closable and openable by a double valve formed by the first and second valve members, wherein, in a closed position of the double valve, the first and second valve members are sealingly engaging a first and a second valve seat, respectively, each valve seat extending around the connecting opening, wherein the first and second valve members are movable relative to each other to allow selective cleaning of the first conduit section, the first valve member, and the first valve seat, respectively the second conduit section, the second valve member, and the second valve seat,
  wherein in a first cleaning position, in which the first conduit section, the first valve member and first valve seat are to be cleaned, the first valve stem is configured to provide a movement of the first valve member towards the first conduit section thereby exposing the first valve seat,
  wherein in a second cleaning position, in which the second conduit section, the second valve member and second valve seat are to be cleaned, the second valve stem is configured to provide a movement of the second valve member along a longitudinal axis thereby exposing the second valve seat,
  wherein the actuator arrangement further comprises a first electrical motor comprising a first rotor and a first stator, the first rotor being rotatable about the longitudinal axis,
  wherein the first valve stem comprises a threaded portion and the first rotor is configured to grip around the threaded portion of the first valve stem such that a first rotational movement of the first rotor provides a first movement of the first valve stem in a direction opposite the longitudinal direction into the first cleaning position,
  wherein the actuator arrangement further comprises a second electrical motor comprising a second rotor and a second stator, the second rotor being rotatable about the longitudinal axis,
  wherein the second valve stem comprises a threaded portion and the second rotor is configured to grip around the threaded portion of the second valve stem such that a first rotational movement of the second rotor provides a first movement of the second valve stem along the longitudinal axis into the second cleaning position.

More explicitly, the actuator arrangement may control the flow control arrangement.

The valve arrangement may comprise a control unit. Alternatively or more precisely, the actuator arrangement may comprise a control unit. In each of these cases, the actuator arrangement is configured to be controlled by the control unit. More explicitly, the actuator arrangement may be controlled by the control unit.

The above object has also been achieved by a method for moving a first valve stem and a second valve stem of an actuator arrangement in order to move a first valve member into a first cleaning position and a second valve member into a second cleaning position, the method comprising:
  providing a first movement of the first valve stem in a direction opposite a longitudinal direction in order to move the first valve member towards a first conduit section thereby exposing a first valve seat extending around a connecting opening and being associated with the first valve member,
  wherein the first movement of the first valve stem is provided by:
    rotating a first rotor of a first electrical motor of the actuator arrangement in a first rotational movement, wherein the first valve stem comprises a threaded portion and the first rotor being configured to grip around the threaded portion of the first valve stem, and transferring the first rotational movement of the first rotor into the first movement of the first valve stem in the direction opposite the longitudinal direction such that the first valve member is moved into the first cleaning position while preferably maintaining the second valve member in sealing engagement with an associated second valve seat, and providing a first movement of the second valve stem along a longitudinal axis in order to move the second valve member in the direction opposite the longitudinal direction towards the first conduit section or in the longitudinal direction towards a second conduit section thereby exposing a second valve seat extending around the connecting opening and being associated with the second valve member, wherein the first movement of the second valve stem is provided by:

rotating a second rotor of a second electrical motor of the actuator arrangement in a first rotational movement, wherein the second valve stem comprises a threaded portion and the second rotor being configured to grip around the threaded portion of the second valve stem, and transferring the first rotational movement of the second rotor into the first movement of the second valve stem along the longitudinal axis such that the second valve member is moved into the second cleaning position while preferably maintaining the first valve member in sealing engagement with an associated first valve seat.

The actuator arrangement of the method may be an actuator arrangement as described above.

The actuator arrangement of the method may be an actuator arrangement of a valve arrangement, which valve arrangement comprises a flow control arrangement and the actuator arrangement.

Thereby, the above object has been achieved by a method for moving a first valve stem and a second valve stem of an actuator arrangement of a valve arrangement, which valve arrangement comprises a flow control arrangement and the actuator arrangement, in order to move a first valve member into a first cleaning position and a second valve member into a second cleaning position, the method comprising the above steps.

In a slightly different wording, the above object has been achieved by a method for moving a first valve stem and a second valve stem of a valve arrangement, which valve arrangement comprises a flow control arrangement and an actuator arrangement, in order to move a first valve member into a first cleaning position and a second valve member into a second cleaning position, the method comprising the above steps.

The valve arrangement of the method may comprise a control unit. Alternatively or more precisely, the actuator arrangement of the method may comprise a control unit.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

Figure 1:
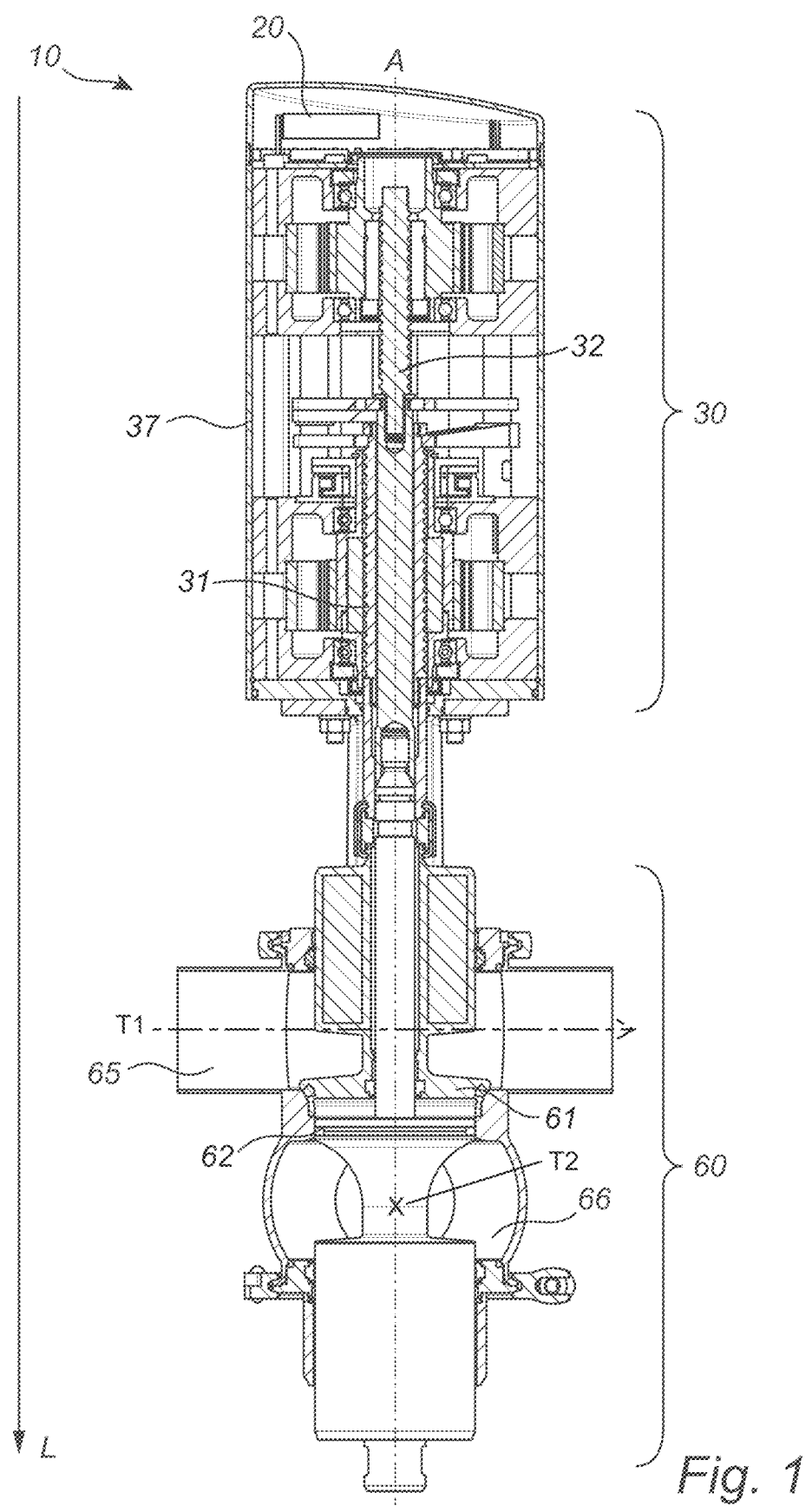
FIG. 1 is a cross-section of an actuator arrangement and a flow control arrangement.
Figure 2:
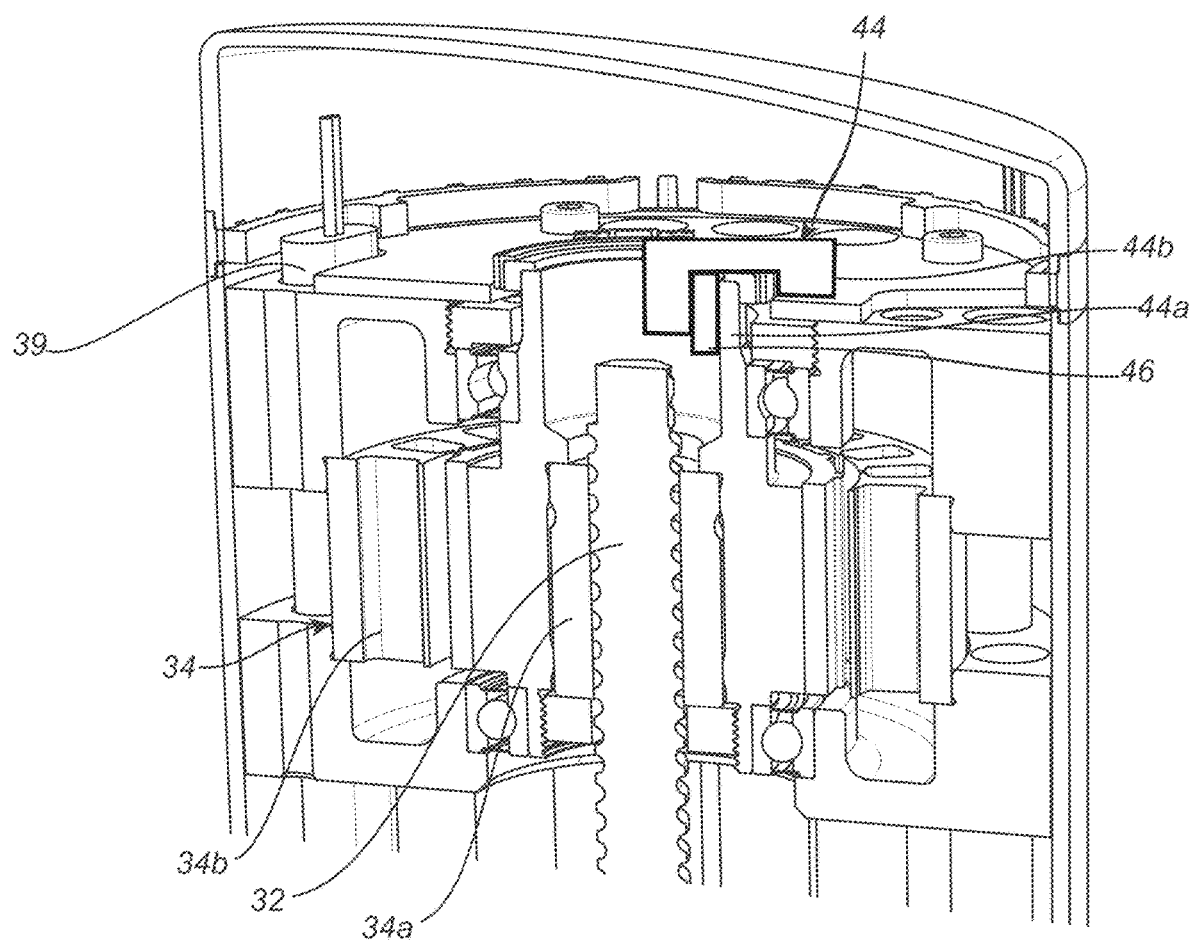
FIG. 2 is a cross-section of a top portion of the actuator arrangement disclosed in FIG. 1.
Figure 3:
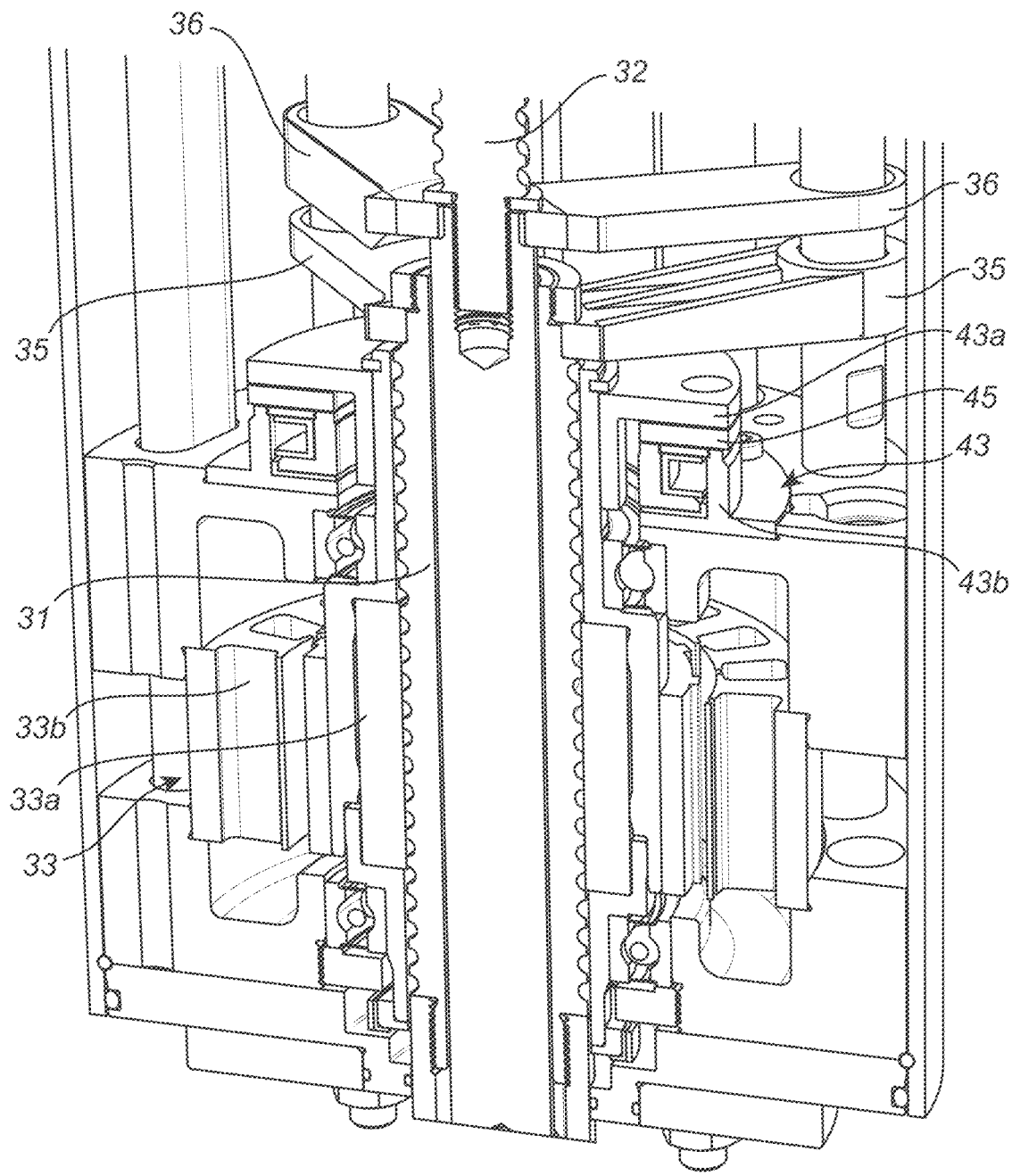
FIG. 3 is a cross-section of a lower portion of the actuator arrangement disclosed in FIG. 1.

With reference to FIGS. 1-3 there is disclosed an actuator arrangement 30 and a flow control arrangement 60. The actuator arrangement 30 is configured to be controlled by a control unit 20. The actuator arrangement 30 is configured to control the flow control arrangement 60. The actuator arrangement 30 may be provided as an integral part of the flow control arrangement 60. Alternatively, the actuator arrangement 30 may be arranged as a kit of part, wherein the flow control arrangement 60 is a separate part configured to be attached to the actuator arrangement 30. The flow control arrangement 60 comprises a first valve member 61 and a second valve member 62.

The actuator arrangement 30 comprises a housing 30. The actuator arrangement 30 comprises a first valve stem 31 and a second valve stem 32. The first and second valve stems 31, 32 extend along a longitudinal axis A. The first and second valve stems 31, 32 extend along, or in, a longitudinal direction L. The first valve stem 31 is connected to and configured to control movement of the first valve member 61 of the flow control arrangement 60. The second valve stem 32 is connected to and configured to control movement of the second valve member 62 of the flow control arrangement 60.

The actuator arrangement 30 further comprises a first electrical motor 33 and a second electrical motor 34. The first electrical motor 33 comprises a first rotor 33a and a first stator 33b. The second electrical motor 34 comprises a second rotor 34a and a second stator 34b. Each rotor 33a, 34a is configured to be rotatable about the longitudinal axis A. Each stator 33b, 34b is configured to be fixedly connected to the housing 37 of the actuator arrangement 30. The first electrical motor 33 is configured to control movement of the first valve stem 31 and the second electrical motor 34 is configured to control movement of the second valve stem 32. When the electrical motors 33, 34 are running, the valve stems 31, 32 are configured to move the first and second valve members 61, 62, respectively.

The flow control arrangement 60 further comprises a first conduit or conduit section 65 and a second conduit or conduit section 66. The first conduit section 65 extends in and is configured to allow a flow of a fluid in a first transverse direction T1. The second conduit section 66 extends in and is configured to allow a flow of a fluid in a second transverse direction T2. The fluid in the first conduit section 65 and the fluid in the second conduit section 66 may be the same fluid. The fluid in the first conduit section 65 and the fluid in the second conduit section 66 may be different fluids. The first and second conduit sections 65, 66 are arranged beside each other as seen along, or in, the longitudinal direction L. The first and second conduit sections 65, 66 are arranged beside each other along the longitudinal axis A.

It is to be noted that in the flow control arrangement 60 shown in the figures, the first and the second conduit sections each extends in a transverse direction T1, T2 and thereby allows a respective flow of a fluid in the transverse directions T1, T2. The transverse directions T1 and T2 are transverse in relation to the longitudinal direction L. However, in this context it may be noted that the conduit sections 65, 66 may have numerous different configurations when it comes to their extension. The conduit sections may, independent of each other, extend in a direction having a component in the longitudinal direction L and/or the direction L' opposite to the longitudinal direction. The conduit sections may, independent of each other, extend in a direction having a component in a transverse direction T1, T2, i.e. in a transverse direction T1, T2 being transverse in relation to the longitudinal direction L. The conduit sections may, independent of each other, extend in a direction having a component in the longitudinal direction L and/or the direction L' opposite to the longitudinal direction as well as a component in a transverse direction T1, T2, i.e. in a transverse direction T1, T2 being transverse in relation to the longitudinal direction L. The conduit sections may, independent of each other, be bent or straight. When it comes to the extension of the conduit sections 65, 66 in the transverse direction or directions T1, T2. The conduit sections 65, 66 may e.g. both extend along straight lines and extend in parallel with each other, i.e. both extending in one and the same transverse direction. They may both extend along straight lines but along different transverse directions. The two transverse directions may form any angle relative to each other. One, or both, of the conduit sections may alternatively be bent such that the inlet portion of the conduit section extends along a first transverse direction and the outlet portion of the conduit section extends along a second transverse direction, being different from the first transverse direction.

Figure 5A:
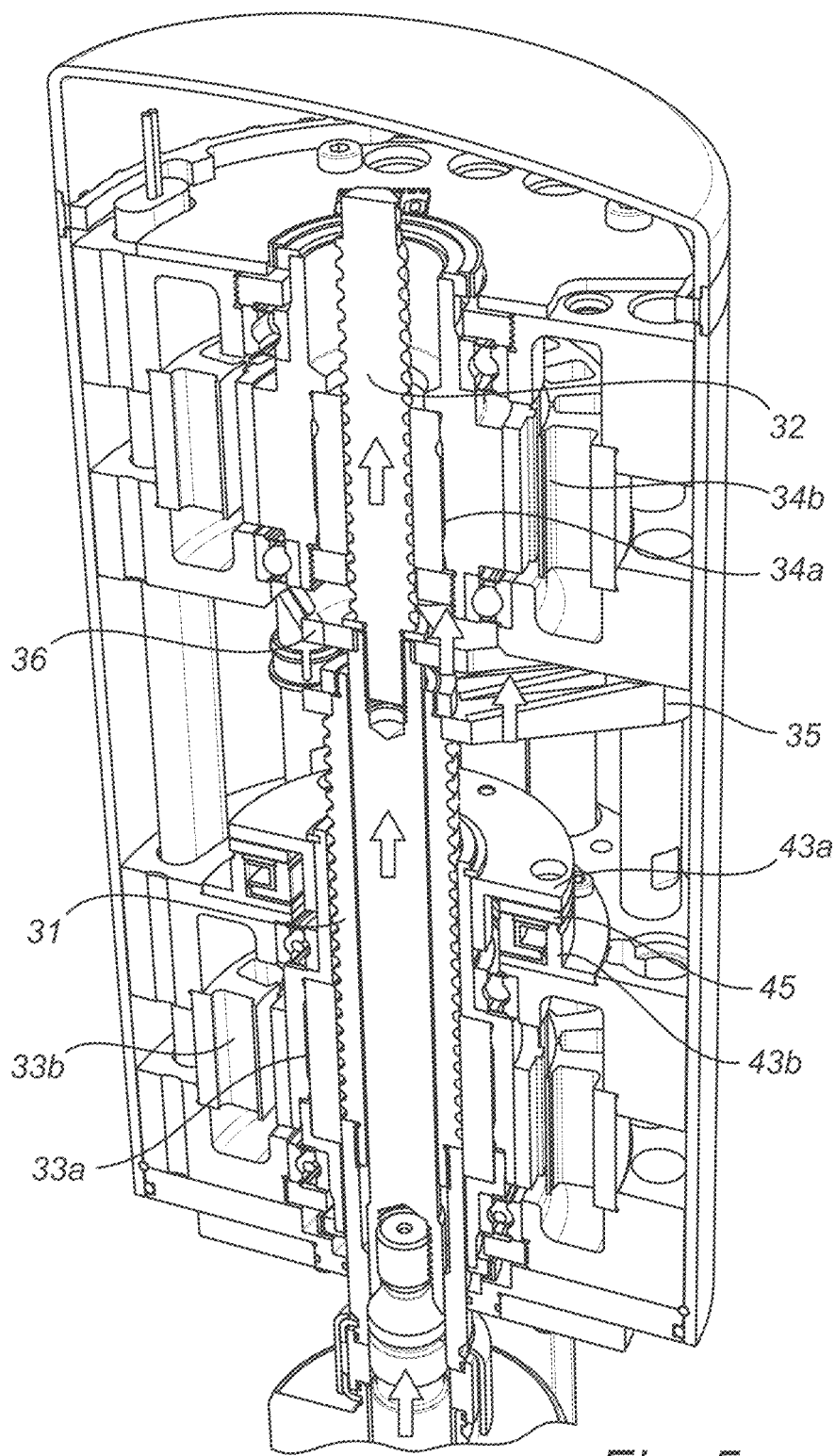
FIG. 5a discloses the same components as FIG. 4a but discloses the actuator arrangement in an open position.
Figure 5B:
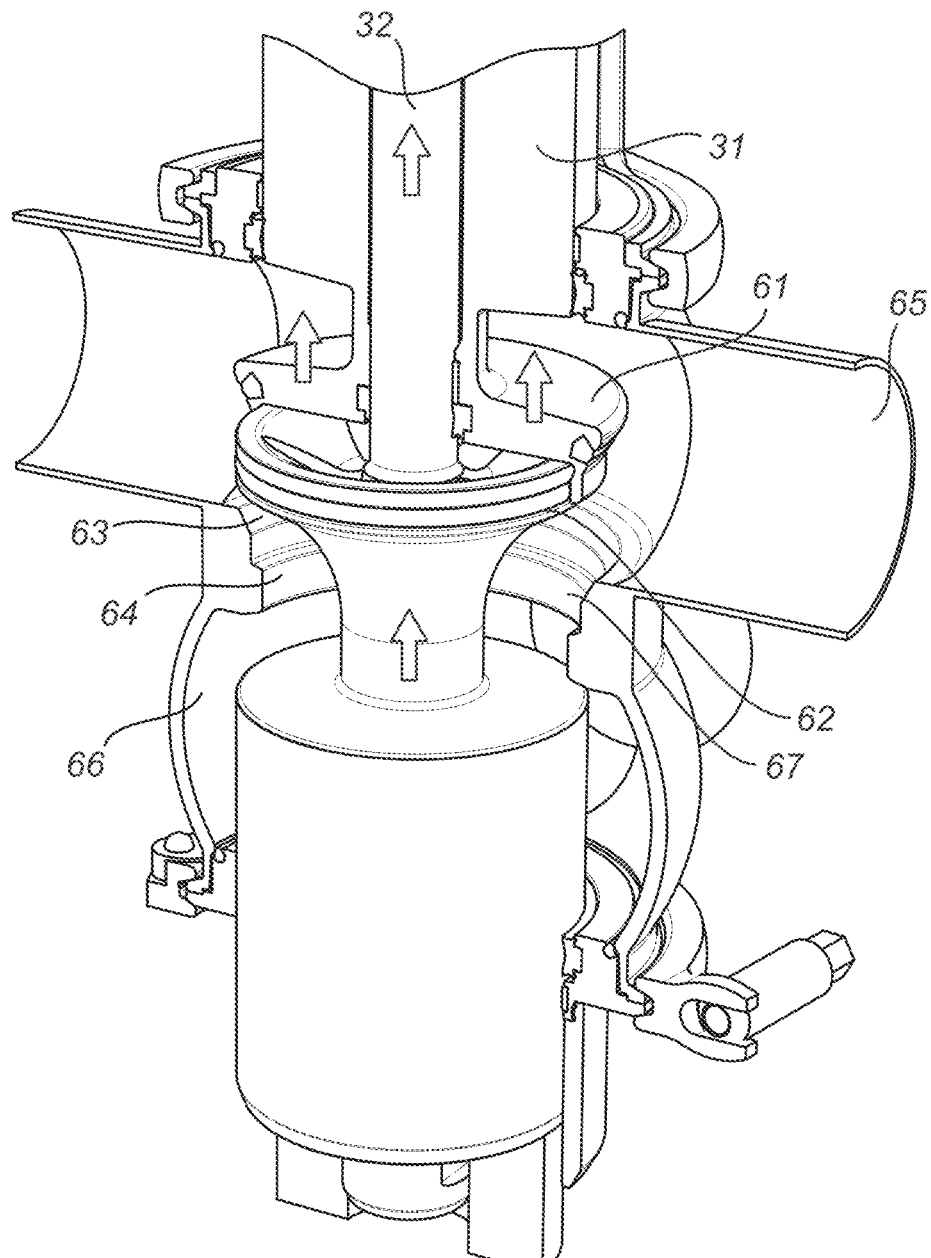
FIG. 5b discloses the same components as FIG. 4b but discloses the flow control arrangement in the open position.

As e.g. illustrated in FIG. 5b, the first and second conduit sections 65, 66 are fluidly interconnected by a connecting opening 67. The connecting opening 67 is selectively closable and openable by a double valve formed by the first and second valve members 61, 62. Moreover, the first and second valve members 61, 62 may be movable relative to each other to allow selective cleaning of the first conduit section 65, the first valve member 61, and the first valve seat 63, respectively the second conduit section 66, the second valve member 62, and the second valve seat 64. As said above, the movement of the first and second valve members 61, 62 being provided by the first and second electrical motor 33, 34, respectively.

Figure 4A:
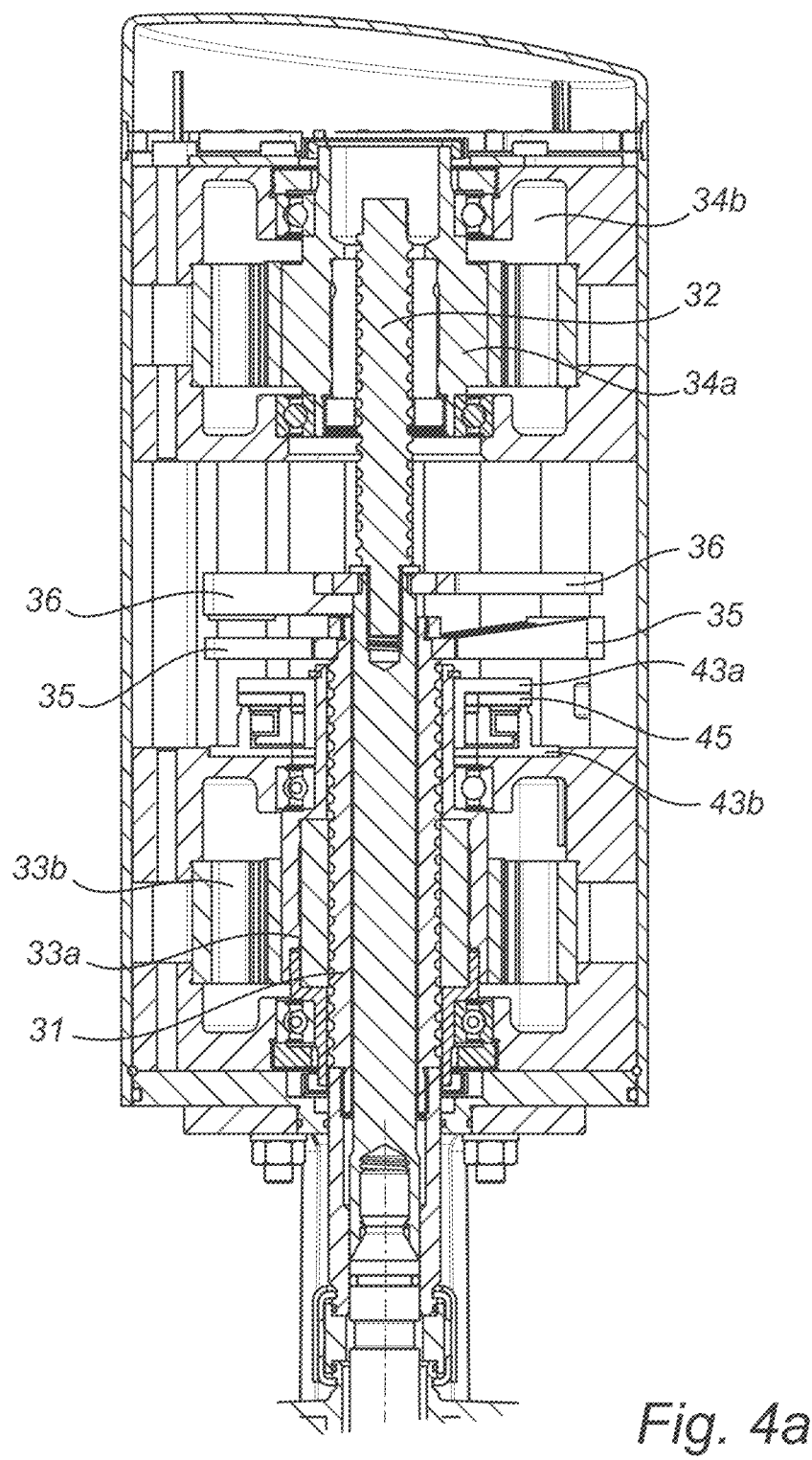
FIG. 4a is an enlargement of a portion of FIG. 1 and discloses the actuator arrangement in a closed position.
Figure 4B:
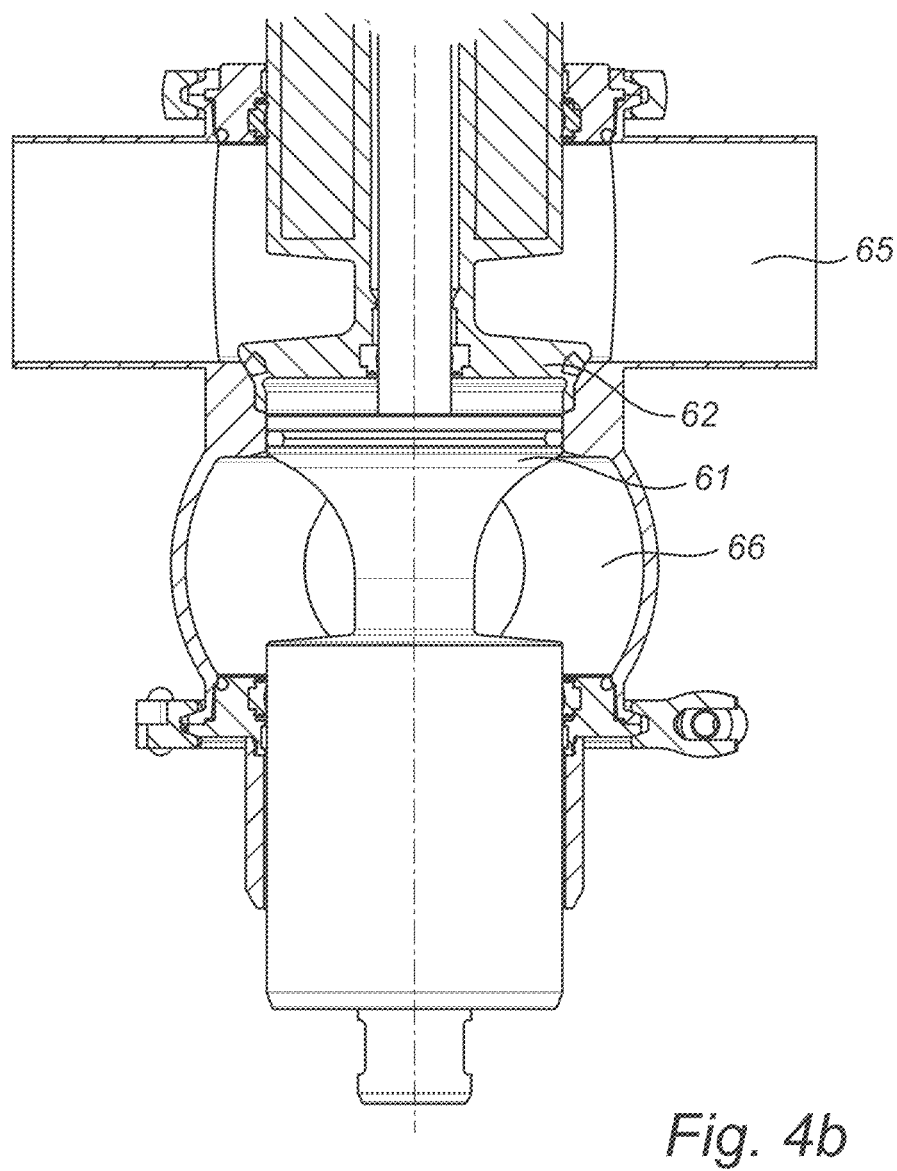
FIG. 4b is an enlargement of a portion of FIG. 1 and discloses the flow control arrangement in the closed position.

In FIGS. 1 and 4b, both the first and second valve members 61, 62 are in a closed position and the double valve is said to be in a closed position. When the double valve is in the closed position, there is no fluid contact between the first and second conduit section 65, 66 and both the first and second valve members 61, 62 sealing engages its respective valve seat 63, 64. The valve seats 63, 64 are best shown in FIG. 5b.

In FIG. 5b, both the first and second valve members 61, 62 are in an open position and the double valve is said to be in an open position. Both the first and second valve members 61, 62 have been moved into the first conduit section 65, in the direction L' opposite the longitudinal direction L, such that none of the valve members 61, 62 is in contact with its respective valve seat 63, 64 and thereby allowing fluid to flow between the first and second conduit sections 65, 66.

Figure 6A:
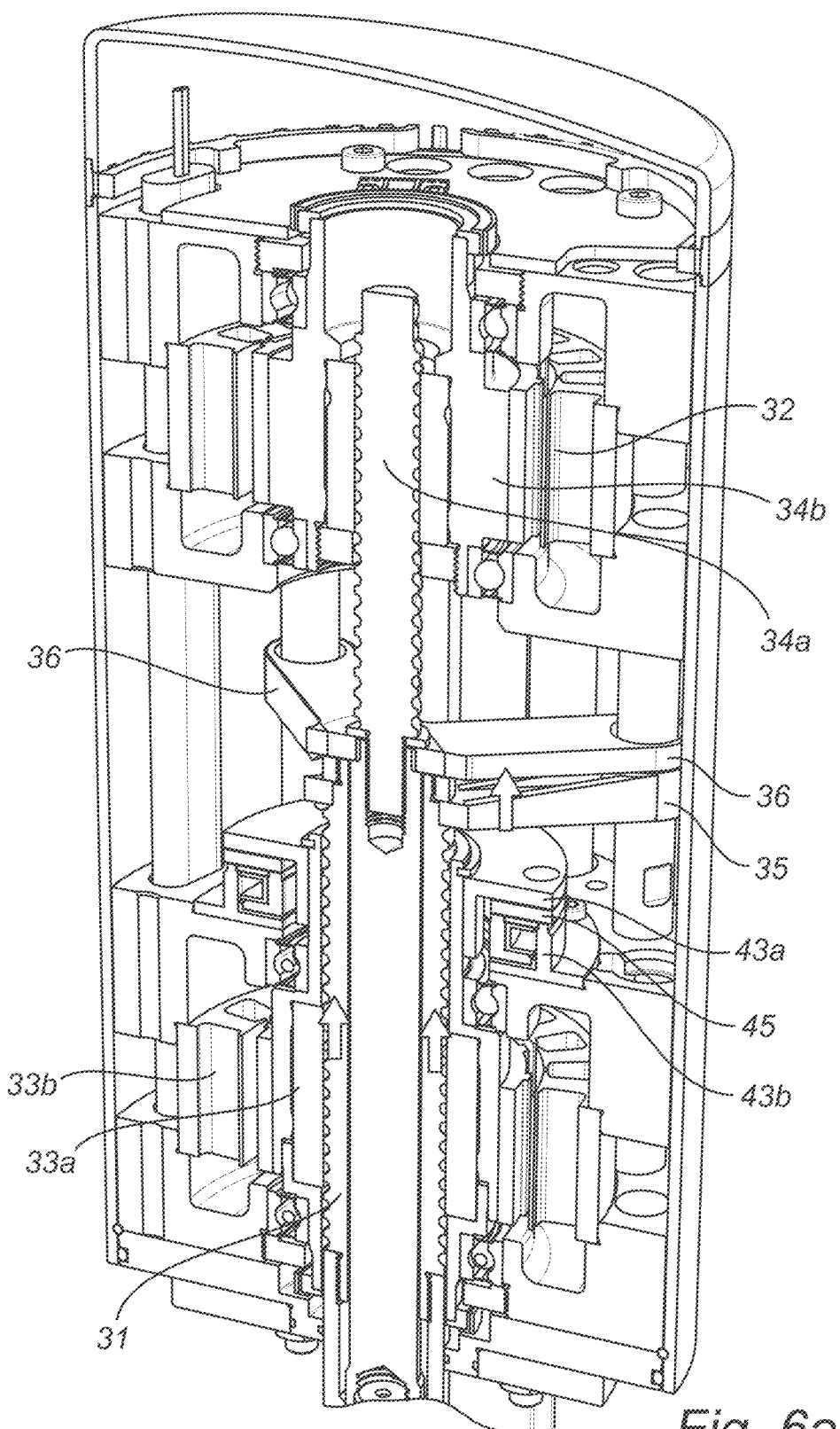
FIG. 6a discloses the same components as FIGS. 4a and 5a but discloses the actuator arrangement in a first cleaning position.
Figure 6B:
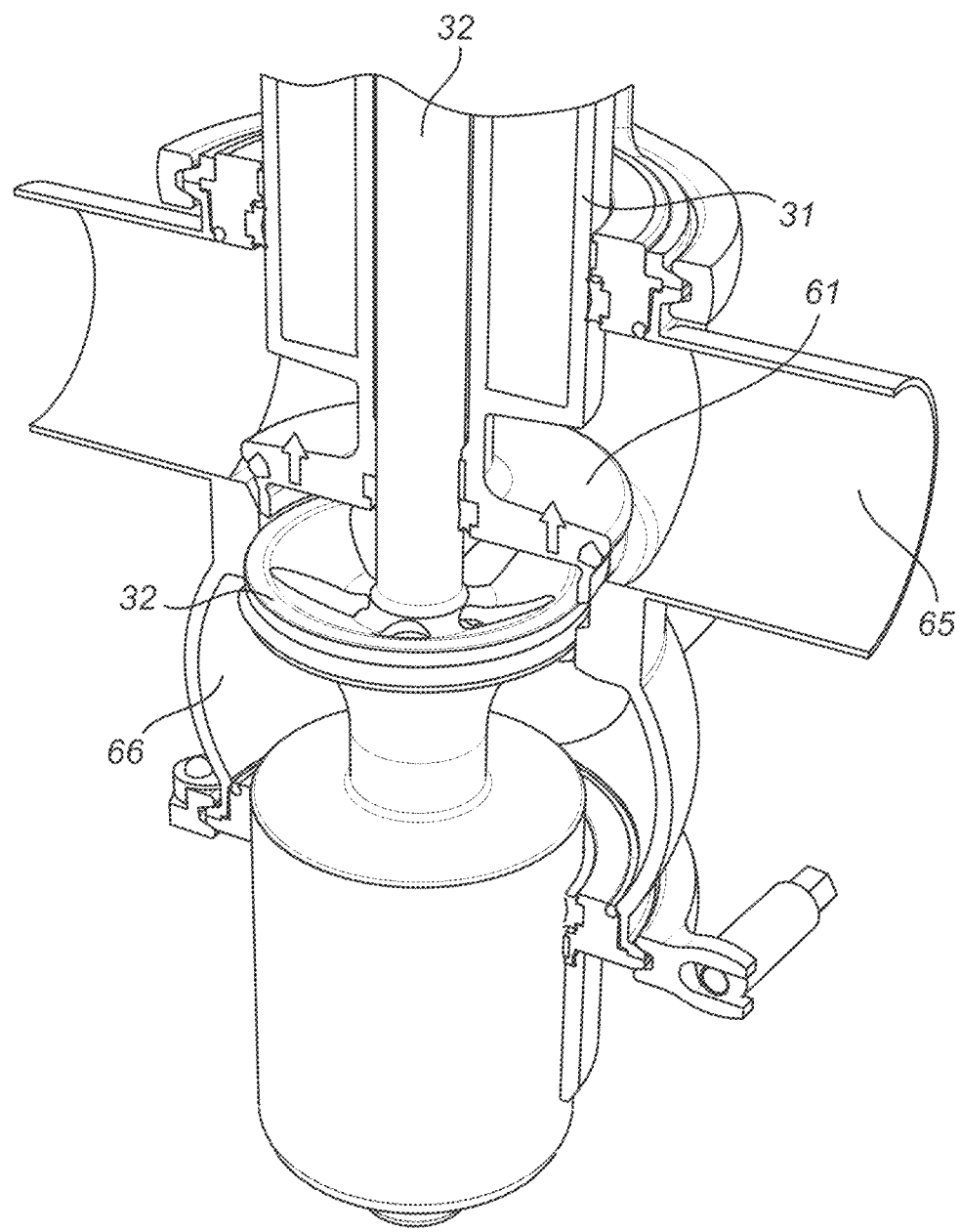
FIG. 6b discloses the same components as FIGS. 4b and 5b but discloses the flow control arrangement in the first cleaning position.

In FIG. 6b the first valve member 61 has been lifted a short distance into the first conduit section 65 thereby exposing the first valve seat 63 associated with the first valve member 61. The second valve member 62 remains in contact with the second valve seat 64 and the connecting opening 67 thereby still remains closed. Thus, there is no fluid connection between the first and the second conduit sections 65, 66. With the valve members 61, 62 in these positions, the first conduit section 65, the first valve member 61 and the first valve seat 63 are to be cleaned. This will herein be referred to as a first cleaning position CP1.

Figure 7A:
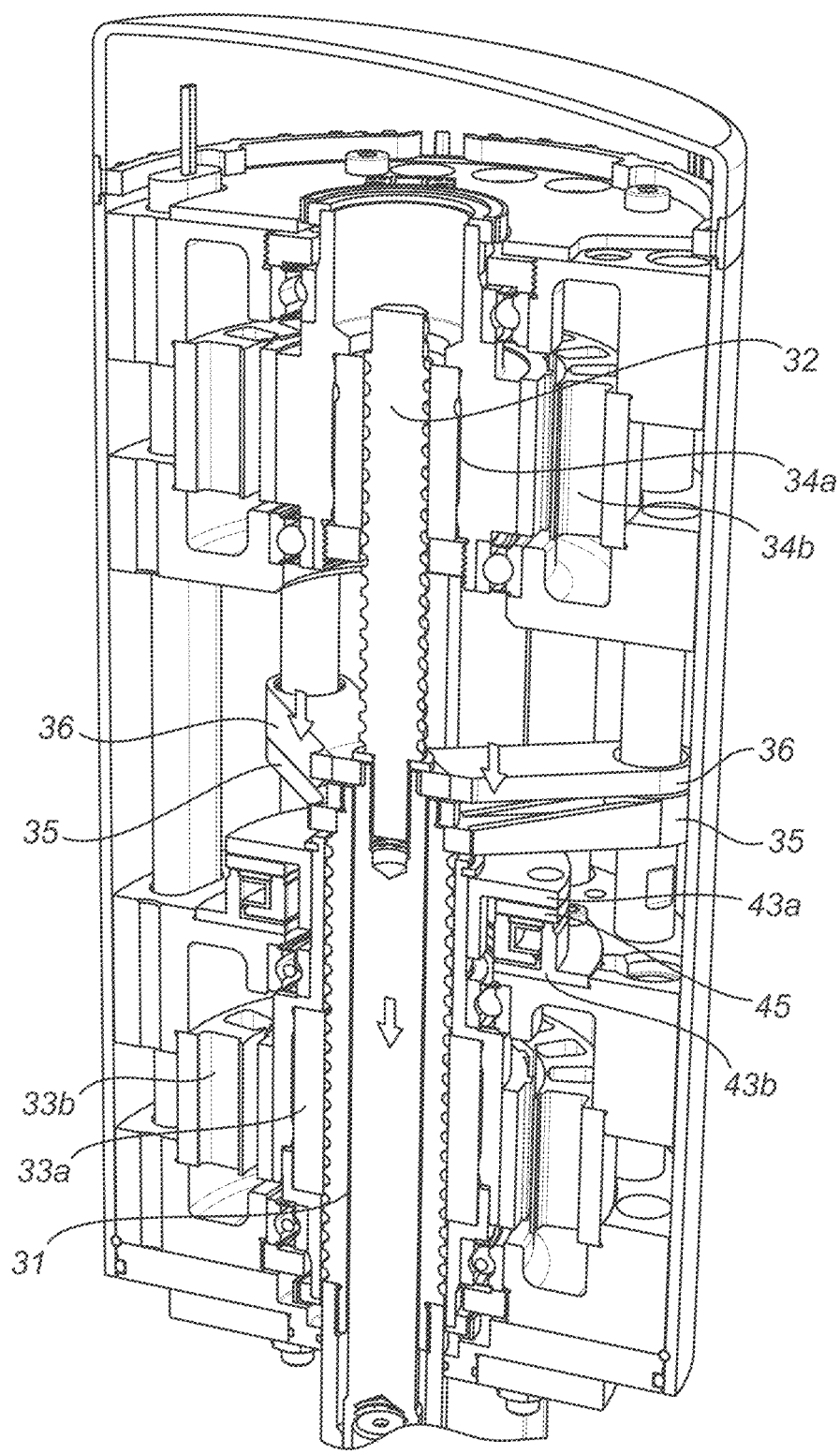
FIG. 7a discloses the same components as FIGS. 4a, 5a and 6a but discloses the actuator arrangement in a second cleaning position.
Figure 7B:
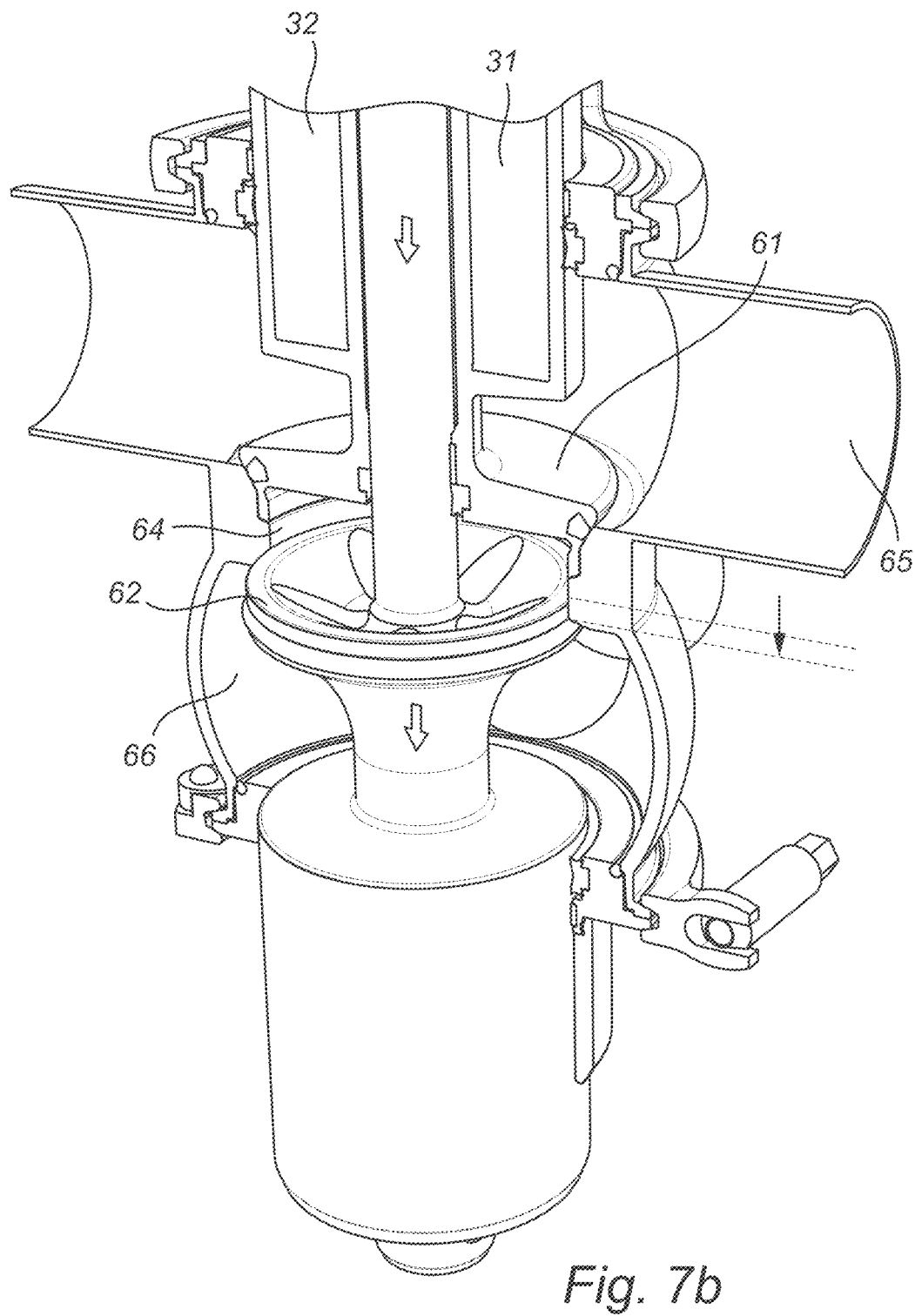
FIG. 7b discloses the same components as FIGS. 4b, 5b and 6b but discloses the flow control arrangement in the second cleaning position.

In FIG. 7b the second valve member 62 has been pushed a short distance into the second conduit section 66 thereby exposing the second valve seat 64 associated with the second valve member 62. The first valve member 61 remains in contact with the first valve seat 63 and the connecting opening 67 thereby still remains closed. Thus, there is no fluid connection between the first and the second conduit sections 65, 66. With the valve members 61, 62 in these positions, the second conduit section 66, the second valve member 62 and the second valve seat 64 are to be cleaned. This will herein be referred to as a second cleaning position CP2. Although not illustrated, the second valve member 62 may be lifted a short distance towards the first conduit section 65 thereby exposing the second valve seat 64 associated with the second valve member 62. This is also referred to as the second cleaning position CP2. Thus, the second valve member 62 may be either pushed a short distance downwards, as seen in FIG. 7b, or lifted a short distance upwards, in order to reach the second cleaning position CP2.

Thus, in summary, in the closed position of the double valve, the first and second valve members 61, 62 are sealingly engaging the first and second valve seats 63, 64, respectively, wherein each valve seat 63, 64 extends around the connecting opening 67. The first and second valve members 61, 62 are movable relative to each other to allow selective cleaning of the first respectively the second conduit section 65, 66 of the first respectively the second valve member 61, 62 and of the first respectively the second valve seat 63, 64.

The actuator arrangement 30 is designed to maneuver the valve members 61, 62 between these four different positions; the closed position shown in FIGS. 1 and 4b, the open position shown in FIG. 5b, the first cleaning position CP1 shown in FIG. 6b and the second cleaning position CP2 shown in FIG. 7b. The actuator arrangement 30 is designed to electrically maneuver the valve members 61, 62 by being operated by first respectively the second electrical motor 33, 34.

Since an object of this invention is to address an issue related to being able to generally improve the movements of the valve members 61, 62 and especially the movement of the valve members 61, 62 to and from the respective cleaning position CP1, CP2, but also between the open and closed positions, the detailed description will primarily focus on how this is accomplished.

As briefly mentioned above, in the first cleaning position CP1, or more precisely when setting in the first cleaning position, or even more precisely when moving from the closed position to the first cleaning position, in which the first conduit section 65, the first valve member 61 and first valve seat 63 are to be cleaned, the first valve stem 31 is configured to provide a movement of the first valve member 61 towards the first conduit section 65 thereby exposing the first valve seat 63.

As briefly mentioned above, and as disclosed in detail in FIGS. 6a and 6b, in the first cleaning position CP1, or more precisely when setting in the first cleaning position, or even more precisely when moving from the closed position to the first cleaning position, in which the first conduit section 65, the first valve member 61 and the first valve seat 63 are to be cleaned, the first electrical motor 33 is configured to provide a movement of the first valve stem 31 which in turn is configured to provide a movement of the first valve member 61 and thereby exposing the first valve seat 63.

As illustrated in FIGS. 6a and 6b, the first valve stem 31 is configured to be moved in the direction L' opposite the longitudinal direction L in order to move the first valve member 61 in the direction L' opposite the longitudinal direction L. The first valve stem 31 is moved by means of the first electrical motor 33 as introduced above. The first rotor 33a of the first electrical motor 33 is configured to transfer at least a portion of a rotational motion, e.g. a first rotational movement, of the first rotor 33a into a linear motion, e.g. a first movement, of the first valve stem 31. The first rotor 33a is configured to transfer the rotation motion to linear motion of the first valve stem 31 by gripping around a threaded portion of the first valve stem 31 when the first rotor 33a is rotated about the longitudinal axis A. Thereby, the rotation motion of the first rotor 33a provides the first movement of the first valve stem 31 in the direction L' opposite the longitudinal direction L into the first cleaning position CP1.

The first rotor 33a may form part of a nut of a ball screw-and-nut assembly, wherein the threaded portion of the first valve stem 31 forms ball trucks of the ball screw-and-nut assembly. Thus, as said above, the first rotor 33a is arranged to transfer rotational motion to linear motion in order to provide for the first valve stem 31 to be moved along the longitudinal axis A with as low internal friction as possible.

As further illustrated in FIGS. 6a and 6b, when the first electrical motor 33 is operated to move the actuator arrangement 30 into the first cleaning position CP1, the second valve stem 32 remains in its position and the second valve member 62 remains in contact with the second valve seat 64 and the connecting opening 67 thereby still remains closed.

The actuator arrangement 30 further comprises a first rotation prevention mechanism. The first rotation prevention mechanism may be arranged between the first valve stem 31 and an inner support structure forming part of or being the housing 37. The first rotation prevention mechanism is configured to prevent the first valve stem 31 from rotating in relation to the housing 37. Typically, the first rotation prevention mechanism is configured to prevent the first valve stem 31 from rotating while the first rotor 33a transfers the rotation motion into the linear motion of the first valve stem 31. In FIG. 6a, the first rotation prevention mechanism is illustrated as a first rotation prevention member 35. The first rotation prevention member 35 is fixed relative to the first valve stem 31 and is connected to the housing 37. Thereby, the first rotation prevention member 35 is rotationally fixed but movable along the longitudinal axis A relative to the housing 37. When the first valve stem 31 is moved by the first electrical motor 33, the first rotation prevention member 35 may be moved together with the first valve stem 31 along the longitudinal axis A while preventing the first valve stem 31 from rotating relative to the housing 37.

Although not illustrated, the first electrical motor 33 is configured to provide a movement of the first valve stem 31 in the longitudinal direction L into the closed position from the first cleaning position in order to provide a complete cleaning cycle. This is provided by rotating the first rotor 33a in an opposite direction compared to the direction of the first rotational movement, such that the first valve stem 31 is moved in the longitudinal direction L into the closed position. Thereby, the first valve member 61 is moved to the first valve seat 63 such that the first valve member 61 is in contact with the first valve seat 63.

As briefly mentioned above, in the second cleaning position CP2, or more precisely when setting in the second cleaning position, or even more precisely when moving from the closed position to the second cleaning position, in which the second conduit section 66, the second valve member 62 and second valve seat 64 are to be cleaned, the second valve stem 32 is configured to provide a movement of the second valve member 62 along the longitudinal axis A thereby exposing the second valve seat 64.

As briefly mentioned above, and as disclosed in detail in FIGS. 7a and 7b, in the second cleaning position CP2, or more precisely when setting in the second cleaning position, or even more precisely when moving from the closed position to the second cleaning position, in which the second conduit section 66, the second valve member 62 and the second valve seat 64 are to be cleaned, the second electrical motor 34 is configured to provide a movement of the second valve stem 32 which in turn is configured to provide a movement of the second valve member 62 and thereby exposing the second valve seat 64.

As illustrated in FIGS. 7a and 7b, the second valve stem 32 is configured to be moved in the longitudinal direction L in order to move the second valve member 62 in the longitudinal direction L. The second valve stem 32 is moved by means of the second electrical motor 34 as introduced above. The second rotor 34a of the second electrical motor 34 is configured to transfer at least a portion of a rotational motion, e.g. a first rotational movement, of the second rotor 34a into a linear motion, e.g. a first movement, of the second valve stem 32. The second rotor 34a is configured to transfer the rotation motion to linear motion of the second valve stem 32 by gripping around a threaded portion of the second valve stem 32 when the second rotor 34a is rotated about the longitudinal axis A. Thereby, the rotation motion of the second rotor 34a provides the first movement of the second valve stem 32 in the longitudinal direction L into the second cleaning position CP2.

The second rotor 34a may form part of a nut of a ball screw-and-nut assembly, wherein the threaded portion of the second valve stem 32 forms ball trucks of the ball screw-and-nut assembly. Thus, as said above, the second rotor 34a is arranged to transfer rotational motion to linear motion in order to provide for the second valve stem 32 to be moved along the longitudinal axis A with as low internal friction as possible.

As further illustrated in FIGS. 6a and 6b, when the second electrical motor 34 is operated to move the actuator arrangement 30 into the second cleaning position CP2, the first valve stem 31 remains in its position and the first valve member 61 remains in contact with the first valve seat 63 and the connecting opening 67 thereby still remains closed.

The actuator arrangement 30 further comprises a second rotation prevention mechanism. The second rotation prevention mechanism may be arranged between the second valve stem 32 and an inner support structure forming part of or being the housing 37. The second rotation prevention mechanism is configured to prevent the second valve stem 32 from rotating in relation to the housing 37. Typically, the second rotation prevention mechanism is configured to prevent the second valve stem 32 from rotating while the second rotor 34a transfers the rotation motion into the linear motion of the second valve stem 32. In FIG. 6a, the second rotation prevention mechanism is illustrated as a second rotation prevention member 36. The second rotation prevention member 36 is fixed relative to the second valve stem 32 and is connected to the housing 37. Thereby, the second rotation prevention member 36 is rotationally fixed but movable along the longitudinal axis A relative to the housing 37. When the second valve stem 32 is moved by the second electrical motor 34, the second rotation prevention member 36 may be moved together with the second valve stem 32 along the longitudinal axis A while preventing the second valve stem 32 from rotating relative to the housing 37.

Although not illustrated, the second electrical motor 34 is configured to provide a movement of the second valve stem 32 in the direction L' opposite the longitudinal direction L into the closed position from the second cleaning position CP2 in order to provide a complete cleaning cycle. This is provided by rotating the second rotor 34a in an opposite direction compared to the direction of the first rotational movement, such that the second valve stem 32 is moved in the direction L' opposite the longitudinal direction L into the closed position. Thereby, the second valve member 62 is moved to the second valve seat 64 such that the second valve member 62 is in contact with the second valve seat 64.

As said above, and although not illustrated, the second valve member 62 may reach the second cleaning position CP2 by being lifted a short distance towards the first conduit section 65 as well. This movement is provided in the similar way as discussed above, wherein the second electrical motor 34 is configured to provide a movement of the second valve stem 32 which in turn provides a movement of the second valve member 62. The difference is however that the second valve member 62 is moved in the direction L' opposite the longitudinal direction L in order to reach the second cleaning position CP2. In order to be moved from the second cleaning position CP2 back to the closed position the second valve member 62 is moved in the longitudinal direction L into the closed position.

As briefly said above, and as disclosed in detail in FIGS. 5a and 5b, in the open position, in which both the first and second valve members 61, 62 have been moved into the first conduit section 65, in the direction L' opposite the longitudinal direction L, such that none of the valve members 61, 62 is in contact with its respective valve seat 63, 64 and thereby allowing fluid to flow between the first and second conduit sections 65, 66.

As illustrated in FIG. 5a, the first and second valve stems 31, 32 are configured to be moved in the direction L' opposite the longitudinal direction into the open position. The first valve stem 31 is moved by means of the first electrical motor 33 as discussed above. In order to move the double valve from the closed position to the open position, the second rotor 34a is configured to grip around the threaded portion of the second valve stem 32 such that a third rotational movement of the second rotor 34a provides a third movement of the second valve stem 32. The third movement of the valve stem 32 is in the direction L' opposite the longitudinal direction L. The second valve stem 32 is moved along, or more precisely in, the direction L' opposite the longitudinal direction L until the second valve member 62 reaches the first valve member 61 such that the first and second valve members 61, 62 are sealingly engaging each other. When the first and second valve members 61, 62 are sealingly engaging each other, the first rotor 33a is configured to grip around the threaded portion of the first valve stem 31 such that a third rotational movement of the first rotor 33a provides a third movement of the first valve stem 31 in the direction L' opposite the longitudinal direction L. When the first and second valve members 61, 62 are sealingly engaging each other, the first and second valve stems 31, 32 moves in a synchronous motion into the open position while maintaining a sealing engagement between the first and second valve members 61, 62.

Thus, the first and second electrical motors 33, 34 are configured to co-operate in order to set the actuator arrangement 30 in the open position.

As briefly said above, and as disclosed in FIGS. 4a and 4b, in the closed position, in which the double valve is in the closed position there is no fluid contact between the first and second conduit section 65, 66 and both the first and the second valve member 61, 62 sealing engages its respective valve seat 63, 64. In the closed position, the first and second valve stem 31, 32 is in their normal, closed, position as well.

Although not illustrated, the double valve is configured to be moved from the open position to the closed position. In order to move the double valve from the open position to the closed position, the first rotor 33a is configured to grip around the threaded portion of the first valve stem 31 such that a fourth rotational movement of the first rotor 33a provides a fourth movement of the first valve stem 31. The fourth movement of the first valve stem 31 is in the longitudinal direction L. The second rotor 34a is configured to grip around the threaded portion of the second valve stem 32 such that a fourth rotational movement of the second rotor 34a provides a fourth movement of the second valve stem 32. The fourth movement of the second valve stem 32 is in the longitudinal direction L. The first and second valve members 61, 62 are sealingly engaging each other during the movement in the longitudinal direction L. The first and second valve stems 31, 32 moves in the synchronous motion until the first valve member engages with the first valve seat 63. Whereafter the second valve stem 32 continues to move until the second valve member 62 engages with the second valve seat 64.

When the actuator arrangement 30 is moved into the open position or from the open position to the closed position, the respective rotational prevent member 35, 36 as introduced above may be moved along the longitudinal axis A while preventing the respective valve stem 31, 32 from rotating relative the housing 37.

Referring back to FIG. 3, the actuator arrangement 30 further comprises a first electrically operated brake 43 comprising a first rotor part 43a and a first stator part 43b. The first rotor part 43a is connected to the first rotor 33a of the first electrical motor 33. The first rotor part 43a may be connected to the first valve stem 31. The first stator part 43b is connected to the housing 37. The first rotor part 43a is configured to be rotatable in relation to the first stator part 43b. The first rotor part 43a may be in contact with the first rotor 33a of the first electrical motor 33 such that when the electrical motor 33 is running, the first rotor part 43a is rotatable together with the first rotor 33a of the first electrical motor 33.

The first electrically operated brake 43 further comprises an electromagnetically operated first interconnection member 45 being movable between an engaged position and an open position. When the first interconnection member 45 is in the open position, the first rotor part 43a is rotatable relative to the first stator part 43b. When the first interconnection member 45 is in the engaged position, the first interconnection member 45 brakes or prevents rotational movement of the first rotor part 43a relative to the first stator 43b. Thereby, when the first interconnection member 45 is in the engaged position, it prevents movement of the first valve stem 31. When the first electrical motor is running 33, the first interconnection member 45 is set in the open position. The electrical motor 33 may be configured to operate the first electrically operated brake 43 such that the first rotor part 43a is rotatable in relation to the first stator part 43b, when the first interconnection member 45 is in the open position. When the first electrical motor 33 is stopped, the first interconnection member 45 is preferably set in the engaged position. Thereby, the first interconnection member 45 is configured to keep the first valve stem 31 from rotating. As the first interconnection member 45 keeps the first valve stem 31 from moving, the first valve stem 31 and the first valve member 61 is kept in position. The first interconnection member 45 is preferably mechanically biased into the engaged position.

The first interconnection member 45 is arranged between the first rotor part 43a and the first stator part 43b. There may be a contact surface formed between the first interconnection member 45 and the first rotor part 43a which provides for that, when the first interconnection member 45 is in the open position, there is a distance formed between the first interconnection member 45 and the first rotor part 43a. In the open position, the first interconnection member 45 is not in contact with the first rotor part 43a. When the first interconnection member 45 is in the engaged position, the first interconnection member 45 is moved towards the first rotor part 43a such that the first interconnection member 45 and the first rotor part 43a is in contact. Thereby, it prevents movement of the first valve stem 31.

Referring back to FIG. 2, the actuator arrangement 30 further comprises second electrically operated brake 44 comprising a second rotor part 44a and a second stator part 44b. The second rotor part 44a is connected to the second rotor 34a of the second electrical motor 34. The second rotor part 44a may be connected to the second valve stem 32. The second stator part 44b is connected to the housing 37. The second rotor part 44a is configured to be rotatable in relation to the second stator part 44b. The second rotor part 44a may be in contact with the second rotor 34a of the second electrical motor 34 such that when the electrical motor 34 is running, the second rotor part 44a is rotatable together with the second rotor 33a of the second electrical motor 33. In FIG. 2, the second interconnection member 46 is arranged between the second rotor part 44a and the second stator part 44b such that the second electrically operated brake 44 may work in the similar way as the first electrically operated brake 43 as discussed above, although having a different design. Thus, when the second interconnection member 46 is in the engaged position, the second interconnection member 46 prevents movement of the second valve stem 32.

Although not illustrated, the second electrically operated brake 44 may be designed in the similar way as the first electrically operated brake 43 discussed above in connection with FIG. 3.

Referring back to FIG. 2, the actuator arrangement 30 further comprises a backup battery 39. The backup battery 39 is configured to, if the first valve stem 31 and/or the second valve stem 32 is in a position different from a normal position, being either the closed position or the open position, and in case of loss of external electrical power, provide electricity to the first electrical motor 33 and/or the second electrical motor 34. When the backup battery 39 provides electricity to the first electrical motor 33 and/or the second electrical motor 34, the electrical motors 33, 34 are configured to set the respective electrically operated brake 43, 44 in the open position and thereby provide a movement of the first valve stem 31 and/or the second valve stem 32 along the longitudinal axis A into the normal position. When the first valve stem 31 and/or second valve stem 32 has reached the normal position, the backup battery 39 is configured to operate the respective electrically operated brake 43, 44 to the engaged position and thereby keep the first valve stem 31 and/or second valve stem 32 in position.

Figure 8:
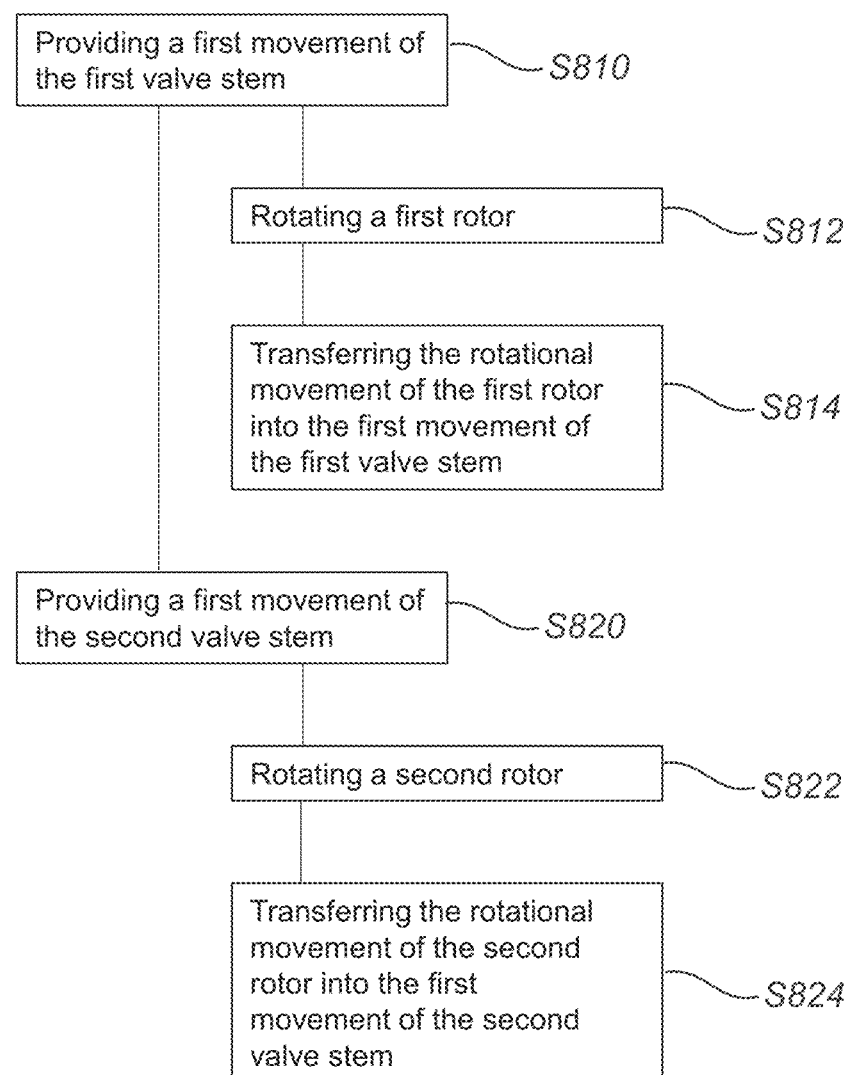
FIG. 8 discloses a flow chart of a method for moving a first valve stem and a second valve stem of an actuator arrangement in order to move a first valve member into a first cleaning position and a second valve member into a second cleaning position.

With reference to FIG. 8, there is also disclose a method 800 for moving a first valve stem 31 and a second valve stem 32 of an actuator arrangement 30 in order to move a first valve member 61 into a first cleaning position CP1 and a second valve member 62 into a second cleaning position CP2. The method 800 comprises providing S810 a first movement of the first valve stem 31 in a direction L' opposite a longitudinal direction L in order to move the first valve member 61 towards a first conduit section 65 thereby exposing a first valve seat 63 extending around a connecting opening 67 and being associated with the first valve member 61, wherein the first movement of the first valve stem 31 is provided by:

rotating S812 a first rotor 33a of a first electrical motor 33 of the actuator arrangement 30 in a first rotational movement, wherein the first valve stem 31 comprises a threaded portion and the first rotor 33a being configured to grip around the threaded portion of the first valve stem 31, and transferring S814 the first rotational movement of the first rotor 33a into the first movement of the first valve stem 31 in the direction L' opposite the longitudinal direction L such that the first valve member 61 is moved into the first cleaning position CP1 while preferably maintaining the second valve member 62 in sealing engagement with an associated second valve seat 64.

The method 800 further comprises providing S820 a first movement of the second valve stem 32 along the longitudinal axis A in order to move the second valve member 62 towards the first conduit section 65 or a second conduit section 66 thereby exposing a second valve seat 64 extending around the connecting opening 67 and being associated with the second valve member 62, wherein the first movement of the second valve stem 32 is provided by:

rotating S822 a second rotor 34a of a second electrical motor 34 of the actuator arrangement 30 in a first rotational movement, wherein the second valve stem 32 comprises a threaded portion and the second rotor 34a being configured to grip around the threaded portion of the second valve stem 32, and transferring S824 the first rotational movement of the second rotor 34a into the first movement of the second valve stem 32 along the longitudinal axis A such that the second valve member 62 is moved into the second cleaning position CP2 while preferably maintaining the first valve member 61 in sealing engagement with an associated first valve seat 63.

It may be noted that the cleaning may depend upon the design of the actuator 30 and the second valve stem 32 may be provided to move the second valve member 62 either in the longitudinal direction L or in the direction L' opposite the longitudinal direction L. However, in the preferred embodiment, the second valve member 62 is moved from its position in the closed position in the longitudinal direction L such that there is formed a gap between the second valve member 62 and the second valve seat 64.

It is contemplated that there are numerous modifications of the embodiments described herein, which are still within the scope of the invention as defined by the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the identified article "a" or "an" does not exclude plurality. The mere fact that certain measures are recited in mutually different dependent claims does not indicate that a combination of these measures cannot be used to advantage.

The invention claimed is:

1. An actuator arrangement being configured to be controlled by a control unit and being configured to control a flow control arrangement, the actuator arrangement comprising:
    a housing,
    a first valve stem extending along a longitudinal direction and being configured to be connected to and control movement of a first valve member of the flow control arrangement,
    a second valve stem extending along the longitudinal direction and being configured to be connected to and control movement of a second valve member of the flow control arrangement,
    wherein the flow control arrangement comprises a first and a second conduit section, each and being configured to allow a respective flow of a respective fluid, wherein the first and second conduit sections are arranged beside each other as seen along the longitudinal direction and wherein the first and second conduit sections are fluidly interconnected by a connecting opening being selectively closable and openable by a double valve formed by the first and second valve members, wherein, in a closed position of the double valve, the first and second valve members are sealingly engaging a first and a second valve seat, respectively, each valve seat extending around the connecting opening, wherein the first and second valve members are movable relative to each other to allow selective cleaning of the first conduit section, the first valve member, and the first valve seat, respectively the second conduit section, the second valve member, and the second valve seat,
    wherein in a first cleaning position, in which the first conduit section, the first valve member and first valve seat are to be cleaned, the first valve stem is configured to provide a movement of the first valve member towards the first conduit section thereby exposing the first valve seat,
    wherein in a second cleaning position, in which the second conduit section, the second valve member and second valve seat are to be cleaned, the second valve stem is configured to provide a movement of the second valve member along a longitudinal axis thereby exposing the second valve seat,
    wherein the actuator arrangement further comprises a first electrical motor comprising a first rotor and a first stator, the first rotor being rotatable about the longitudinal axis,
    wherein the first valve stem comprises a threaded portion and the first rotor is configured to grip around the threaded portion of the first valve stem such that a first rotational movement of the first rotor provides a first movement of the first valve stem in a direction opposite the longitudinal direction into the first cleaning position,
    wherein the actuator arrangement further comprises a second electrical motor comprising a second rotor and a second stator, the second rotor being rotatable about the longitudinal axis,
    wherein the second valve stem comprises a threaded portion and the second rotor is configured to grip around the threaded portion of the second valve stem such that a first rotational movement of the second rotor provides a first movement of the second valve stem along the longitudinal axis into the second cleaning position.

2. The actuator arrangement according to claim 1, wherein the first and the second conduit section, each extends in and is configured to allow a respective flow of a respective fluid in a transverse direction.

3. The actuator arrangement according to claim 1, wherein the first rotor is further configured to grip around the threaded portion of the first valve stem such that a second rotational movement, being opposite the first rotational movement, of the first rotor provides a second movement of the first valve stem in the longitudinal direction into the closed position.

4. The actuator arrangement according to claim 1, wherein the second rotor is further configured to grip around the threaded portion of the second valve stem such that a second rotational movement, being opposite the first rotational movement, of the second rotor provides a second movement of the second valve stem along the longitudinal axis in a direction being opposite the direction of the first movement of the second valve stem into the closed position.

5. The actuator arrangement according to claim 1, wherein, in order to set the double valve in an open position in which the first valve member and the second valve member is moved towards the first conduit section to thereby open the connecting opening and allowing fluid to flow between the first and second conduit sections,
    the second rotor is configured to grip around the threaded portion of the second valve stem such that a third rotational movement of the second rotor provides a third movement of the second valve stem in the direction opposite the longitudinal direction, the second valve stem being moved along the direction opposite the longitudinal direction until the second valve member reaches the first valve member such that the first and second valve members are sealingly engaging each other, and when the first and second valve members are sealingly engaging each other, the first rotor is configured to grip around the threaded portion of the first valve stem such that a third rotational movement of the first rotor- provides a third movement of the first valve stem in the direction opposite the longitudinal direction, wherein, when the first and second valve members are sealingly engaging each other, the first and second valve stems move in a synchronous motion into the open position while maintaining a sealing engagement between the first and second valve members.

6. The actuator arrangement according to claim 5, wherein, in order to move the double valve from the open position to a closed position in which the first valve member and the second valve member engages with respective valve seat, the first rotor is configured to grip around the threaded portion of the first valve stem such that a fourth rotational movement of the first rotor in a direction opposite the third rotational movement of the first rotor provides a fourth movement of the first valve stem along the longitudinal direction into the closed position, and the second rotor is configured to grip around the threaded portion of the second valve stem such that a fourth rotational movement of the second rotor in a direction opposite the third rotational movement of the second rotor provides a fourth movement of the second valve stem in the longitudinal direction into the closed position, wherein the first and second valve members are sealingly engaging each other during the movement in the longitudinal direction, wherein the first and second valve stems move in the synchronous motion, until the first valve member engages with the first valve seat and whereafter the second valve stem continues to move until the second valve member engages with the second valve seat.

7. The actuator arrangement according to claim 1, wherein the first rotor forms part of a nut of a ball screw-and-nut assembly and the threaded portion of the first valve stem forms ball tracks guiding balls of the ball screw-and-nut assembly.

8. The actuator arrangement according to claim 1, wherein the second rotor forms part of a nut of a ball screw-and-nut assembly and the threaded portion of the second valve stem forms ball tracks guiding balls of the ball screw-and-nut assembly.

9. The actuator arrangement according to claim 1, the actuator arrangement further comprising a first rotation prevention mechanism being arranged between the first valve stem and an inner support structure forming part of or being connected to the housing of the actuator arrangement and being configured to prevent the first valve stem from rotating in relation to the housing.

10. The actuator arrangement according to claim 9, wherein the first rotation prevention mechanism comprises a first rotation prevention member which is fixed relative to the first valve stem and which is connected to the housing such that the first rotation prevention member is rotationally fixed but movable along the longitudinal axis relative to the housing and such that the first rotation prevention member is movable together with the first valve stem along the longitudinal axis while preventing the first valve stem from rotating relative to the housing.

11. The actuator arrangement according to claim 1, the actuator arrangement further comprising a second rotation prevention mechanism being arranged between the second valve stem and an inner support structure forming part of or being connected to the housing of the actuator arrangement and being configured to prevent the second valve stem from rotating in relation to the housing.

12. The actuator arrangement according to claim 11, wherein the second rotation prevention mechanism comprises a second rotation prevention member which is fixed relative to the second valve stem and which is connected to the housing such that the second rotation prevention member is rotationally fixed but movable along the longitudinal axis relative to the housing and such that the second rotation prevention member is movable together with the second valve stem along the longitudinal axis while preventing the second valve stem from rotating relative to the housing.

13. The actuator arrangement according to claim 1 further comprising:

a first electrically operated brake comprising a first rotor part connected to the first valve stem or to the first rotor of the first electrical motor, a first stator part connected to the housing, and an electromagnetically operated first interconnection member being movable between an engaged position and an open position, wherein when the first interconnection member is in the open position the first rotor part is rotatable relative to the first stator part and when the first interconnection member is in the engaged position the first interconnection member brakes or prevents rotational movement of the first rotor part relative to the first stator part and thereby prevents movement of the first valve stem, wherein, when the first electrical motor is running, the first interconnection member is set in the open position, and wherein when the first electrical motor is stopped, the first interconnection member is set in the engaged position and is thereby configured to keep the first valve stem from moving and thereby keeping the first valve stem and first valve member in position, wherein the first interconnection member of the first electrically operated brake is mechanically biased into the engaged position.

14. The actuator arrangement according to claim 1 further comprising:

a second electrically operated brake comprising a second rotor part connected to the second valve stem or to the second rotor of the second electrical motor, a second stator part connected to the housing, and an electromagnetically operated second interconnection member being movable between an engaged position and an open position, wherein when the second interconnection member is in the open position the second rotor part is rotatable relative to the second stator part and when the second interconnection member is in the engaged position the second interconnection member brakes or prevents rotational movement of the second rotor part relative to the second stator part and thereby prevents movement of the second valve stem, wherein, when the second electrical motor is running, the second interconnection member is set in the open position, and wherein when the second electrical motor is stopped, the second interconnection member is set in the engaged position and is thereby configured to keep the second valve stem from moving and thereby keeping the second valve stem and second valve member in position, wherein the second interconnection member of the second electrically operated brake is mechanically biased into the engaged position.

15. The actuator arrangement according to claim 13, wherein the actuator arrangement further comprises a backup battery configured to, if the first valve stem and/or the second valve stem is in a position different from a normal position, and in case of loss of external electrical power, provide electricity to the first electrical motor and/or the second electrical motor and set the respective electrically operated brake in the open position and thereby provide a movement of the first valve stem and/or the second valve stem along the longitudinal axis into the normal position, and, when the first valve stem and/or second valve stem has reached the normal position, operate the respective electrically operated brake to the engaged position and thereby keep the first valve stem and/or second valve stem in position.

16. Valve arrangement comprising a flow control arrangement and an actuator arrangement according to claim 1.

17. A method for moving a first valve stem and a second valve stem of an actuator arrangement in order to move a first valve member into a first cleaning position and a second valve member into a second cleaning position, the method comprising:
   providing a first movement of the first valve stem in a direction opposite a longitudinal direction in order to move the first valve member towards a first conduit section thereby exposing a first valve seat extending around a connecting opening and being associated with the first valve member,
   wherein the first movement of the first valve stem is provided by:
   rotating a first rotor of a first electrical motor of the actuator arrangement in a first rotational movement, wherein the first valve stem comprises a threaded portion and the first rotor-being configured to grip around the threaded portion of the first valve stem, and
   transferring the first rotational movement of the first rotor into the first movement of the first valve stem in the direction opposite the longitudinal direction such that the first valve member is moved into the first cleaning position while preferably maintaining the second valve member in sealing engagement with an associated second valve seat, and
providing a first movement of the second valve stem along a longitudinal axis in order to move the second valve member in the direction opposite the longitudinal direction-towards the first conduit section or in the longitudinal direction towards a second conduit section thereby exposing a second valve seat extending around the connecting opening and being associated with the second valve member,
wherein the first movement of the second valve stem is provided by:
rotating a second rotor of a second electrical motor of the actuator arrangement in a first rotational movement, wherein the second valve stem comprises a threaded portion and the second rotor being configured to grip around the threaded portion of the second valve stem, and
transferring the first rotational movement of the second rotor into the first movement of the second valve stem along the longitudinal axis such that the second valve member is moved into the second cleaning position while maintaining the first valve member in sealing engagement with an associated first valve seat.

* * * * *